(12) United States Patent
Kurahashi et al.

(10) Patent No.: US 7,821,282 B2
(45) Date of Patent: Oct. 26, 2010

(54) INVERTER THAT CALCULATES AN AVERAGE VALUE OF DIRECT CURRENT DC

(75) Inventors: Yasufumi Kurahashi, Shiga (JP); Naomi Goto, Shiga (JP)

(73) Assignee: Panasonic Corporation, Osaka (JP)

( * ) Notice: Subject to any disclaimer, the term of this patent is extended or adjusted under 35 U.S.C. 154(b) by 160 days.

(21) Appl. No.: 11/910,093

(22) PCT Filed: Mar. 28, 2006

(86) PCT No.: PCT/JP2006/306246

§ 371 (c)(1), (2), (4) Date: Sep. 28, 2007

(87) PCT Pub. No.: WO2006/106654

PCT Pub. Date: Oct. 12, 2006

(65) Prior Publication Data

US 2008/0272762 A1 Nov. 6, 2008

(30) Foreign Application Priority Data

| Mar. 30, 2005 | (JP) | ................... 2005-097413 |
| Apr. 21, 2005 | (JP) | ................... 2005-123238 |
| Apr. 25, 2005 | (JP) | ................... 1005-126060 |
| Oct. 13, 2005 | (JP) | ................... 2005-298640 |
| Feb. 14, 2006 | (JP) | ................... 2006-036308 |
| Mar. 16, 2006 | (JP) | ................... 2006-072341 |

(51) Int. Cl.
*G01R 31/02* (2006.01)

(52) U.S. Cl. ................... 324/764; 324/763; 324/765; 318/400.17

(58) Field of Classification Search ................... 324/772, 324/764, 765; 318/400.17
See application file for complete search history.

(56) References Cited

U.S. PATENT DOCUMENTS

| 4,641,066 | A | * | 2/1987 | Nagata et al. | ........... 318/400.37 |
| 5,422,570 | A | * | 6/1995 | Moreira | ................... 324/177 |
| 5,519,301 | A | * | 5/1996 | Yoshida et al. | ............... 318/811 |
| 5,548,197 | A | * | 8/1996 | Unsworth et al. | ............ 318/757 |
| 5,640,073 | A | * | 6/1997 | Ikeda et al. | ............. 318/400.03 |

(Continued)

FOREIGN PATENT DOCUMENTS

CN 1542279 A 11/2004

(Continued)

OTHER PUBLICATIONS

International Search Report for Application No. PCT/JP2006/306246 dated Jun. 13, 2006.

*Primary Examiner*—Ha Tran T Nguyen
*Assistant Examiner*—Richard Isla Rodas
(74) *Attorney, Agent, or Firm*—RatnerPrestia

(57) ABSTRACT

An inverter has an inverter circuit and a current detector. In the inverter circuit, upper-arm switching elements and lower-arm switching elements, which are connected to DC power supply, provide DC with pulse-width modulation (PWM) so as to output AC to a load. The current detector detects current of the load. With the structure above, the inverter calculates an average value of DC that flows between the DC power supply and the inverter circuit according to a product of an ON-period in which any one of the switching elements maintains ON and a current value detected by the current sensor.

33 Claims, 16 Drawing Sheets

U.S. PATENT DOCUMENTS

| | | | |
|---|---|---|---|
| 5,663,627 A * | 9/1997 | Ogawa | 318/803 |
| 5,712,540 A * | 1/1998 | Toda et al. | 318/46 |
| 5,963,442 A * | 10/1999 | Yoshida et al. | 363/98 |
| 6,034,494 A * | 3/2000 | Kitamine et al. | 318/400.11 |
| 6,081,091 A * | 6/2000 | Mitchell et al. | 318/685 |
| 6,469,462 B2 * | 10/2002 | Shimane et al. | 318/280 |
| 6,548,984 B2 * | 4/2003 | Shamoto et al. | 318/801 |
| 6,661,190 B1 * | 12/2003 | Atmur | 318/400.09 |
| 6,873,125 B2 * | 3/2005 | Seima et al. | 318/400.09 |
| 7,023,158 B2 * | 4/2006 | Hirono | 318/400.11 |
| 7,084,598 B2 * | 8/2006 | Yoshida et al. | 318/400.11 |
| 7,486,489 B2 * | 2/2009 | Dragoi et al. | 361/23 |

FOREIGN PATENT DOCUMENTS

| | | | |
|---|---|---|---|
| JP | 07-067248 | | 3/1995 |
| JP | 08-144792 A | | 6/1996 |
| JP | 2000-333465 A | | 11/2000 |
| JP | 2002-095263 A | | 3/2002 |
| JP | 2003-209976 A | | 7/2003 |
| JP | 2003209976 A | * | 7/2003 |
| JP | 2004-282969 A | | 10/2004 |
| JP | 2004-297938 A | | 10/2004 |

* cited by examiner

Period (a)

Period (b)

U-phase current

V-phase lower-arm switching element ON
W-phase lower-arm switching element ON

Period (c)

W-phase current

W-phase lower-arm switching element ON

INVERTER THAT CALCULATES AN AVERAGE VALUE OF DIRECT CURRENT DC

THIS APPLICATION IS A U.S. NATIONAL PHASE APPLICATION OF PCT INTERNATIONAL APPLICATION PCT/JP2006/306246.

TECHNICAL FIELD

The present invention relates to an inverter that calculates an average value of direct current (DC) fed from DC power supply.

BACKGROUND ART

As a method for calculating an average of DC fed from DC power supply, a conventionally well-known method is disclosed in Japanese Patent Unexamined Publication No. H07-67248 (see P. 5, FIGS. 1 and 2). In the method, a current sensor for detecting DC is disposed on the power-supply line from DC power supply to an inverter and the integral of the detected current is obtained by a resistor and a capacitor.

FIG. 23 is a circuit diagram showing a conventional inverter and the peripheral circuits thereof. According to an rpm instruction signal (not shown) and the like, control circuit 108 of inverter 121 effects control of switching elements 2 of inverter circuit 37 so that DC voltage from battery 1 is switched by pulse-width modulation (PWM). Through the modulation, alternating current (AC) is fed to stator winding 28 of motor 30, and rotor 29 outputs power. In the explanations given hereinafter, it will be assumed that switching elements 2 are formed of upper-arm switching elements U, V, W and lower-arm switching elements X, Y, Z. Switching elements 2 are formed of a transistor, an IGBT (insulated gate bipolar transistor) and the like. Diodes 3 of inverter circuit 37 form a return route of current from stator winding 28.

Current sensor 6 is disposed between battery 1 and inverter circuit 37. Current sensor 6 detects a DC instantaneous value and sends it to operational amplifier 11. The DC instantaneous value is carried to control circuit 108 and is used for protecting switching elements 2. The value is also fed into an integrating circuit of resistor 12 and capacitor 13 and converted into an average value. Receiving the average value, control circuit 108 calculates the product of the average value and the voltage of battery 1 to obtain an input power for inverter 121. The input power for inverter 121 corresponds to power consumption of battery 1. Calculating the input power to be fed to inverter 121 is indispensable for monitoring and suppressing power consumption (i.e., electrical load) of battery 1.

On the other hand, detection of motor current (i.e., phase current) is well known as a method for controlling a motor with high accuracy and providing the motor with sine waveshaped AC. Japanese Patent Unexamined Publication No. 2000-333465 (see P. 8, FIG. 1) discloses an example of the method, which will be described hereinafter.

FIG. 24 is a circuit diagram showing a conventional inverter and the peripheral circuits thereof. Current sensors 8 and 9 for detecting phase current are disposed between inverter circuit 37 and motor 31.

Control circuit 104 of inverter 120 receives a current value of U-phase from current sensor 8 and a current value of W-phase from current sensor 9. With the use of the two values obtained above, control circuit 104 calculates a current value of V-phase by Kirchhoff's current law applied at a neutral point of stator winding 28. According to the values for each phase, control circuit 104 further calculates induced voltage on stator winding 28 caused by magnet rotor 32 and determines the position of magnet rotor 32. According to an rpm instruction signal (not shown) and the like, control circuit 104 effects control of switching elements 2 of inverter circuit 37 so that DC voltage from battery 1 is switched by PWM. Through the modulation, sine wave-shaped AC is fed to stator winding 28.

As for the method for detecting phase current of a motor, Japanese Patent Unexamined Publication No. 2003-209976 introduces another example (see P. 21, FIG. 14).

FIG. 25 shows an inverter and the peripheral circuits thereof. A shunt for detecting phase current is disposed between the lower-arm switching elements and the battery 1; specifically, the circuit has shunt 15 disposed between ground and lower-arm switching element X for U-phase, shunt 16 disposed between the ground and lower-arm switching element Y for V-phase and shunt 17 disposed between the ground and lower-arm switching element Z for W-phase.

Control circuit 107 of inverter 122 calculates a current value of each phase according to the values of voltage from each shunt. According to the calculated current value, an rpm instruction signal (not shown) and the like, control circuit 107 effects control of switching elements 2 of inverter circuit 37 so that DC voltage from battery 1 is switched by PWM. Through the modulation, sine wave-shaped AC is fed to stator winding 28.

Operational amplifier 11 of the structure shown in FIG. 23 is not an absolute necessity. FIGS. 24 and 25 show the structures with no operational amplifier.

In the inverter having a current sensor between DC power supply (i.e., a battery) and an inverter circuit, to calculate an average value of DC fed from DC power supply, the structure requires—other than a current sensor and an operational amplifier—the following components: an integrating circuit formed of a resistor and a capacitor; an A/D port for receiving average current of a microprocessor in the control circuit. Each value obtained by the resistor and the capacitor of the integrating circuit has variations in resistance values, capacitance values and temperature change, which can invite poor accuracy in calculating an average value. To obtain higher accuracy, there is a need to know the correlation between the integral obtained by the integrating circuit and an actual average current. Besides, increase in parts count becomes an obstacle to downsizing and improvement of reliability.

In the inverter having a current sensor for detecting load current (i.e., phase current of a motor) between the inverter circuit and load (i.e., a motor), DC fed from DC power supply cannot be detected (, which means that average current also cannot be obtained). That is, the structure cannot calculate power consumption of DC power supply. From the detected phase current, the structure can calculate AC to be fed to the motor; in this case, there becomes a need to carry out additional computing, such as phase difference between current and voltage and calculation of PWM voltage. This places a significant computational burden on the microprocessor of the control circuit. Even if AC is calculated as a substitute for DC current, the calculated value has lack of accuracy since the power consumption of the inverter is not included.

Like in the inverter described above, the measurement of DC fed from DC power supply cannot be made by an inverter having a shunt for detecting phase current between the lower-arm switching elements and DC power supply (i.e., a battery). Therefore, the inverter also faces the aforementioned problems.

SUMMARY OF THE INVENTION

The present invention addresses the aforementioned pending problems. It is therefore an object of the present invention to provide a compact, reliable inverter capable of calculating a DC average value with high accuracy.

The inverter of the present invention has an inverter circuit and a current detector. In the inverter circuit, upper-arm switching elements and lower-arm switching elements, which are connected to DC power supply, provide DC current with PWM so as to output AC to a load. The current detector detects current of the load. With the structure above, the inverter calculates an average value of DC that flows between DC power supply and the inverter circuit according to a product of an ON-period in which any one of the switching elements maintains ON and a current value detected by the current sensor.

Employing the structure above, the inverter calculates a DC average value without an integrating circuit (of a resistor and a capacitor) and an A/D port (for receiving a DC average value to a microprocessor of a control circuit). That is, the structure of the present invention provides a compact, reliable inverter capable of calculating a DC average value with high accuracy.

REFERENCE MARKS IN THE DRAWINGS

Figure 1:
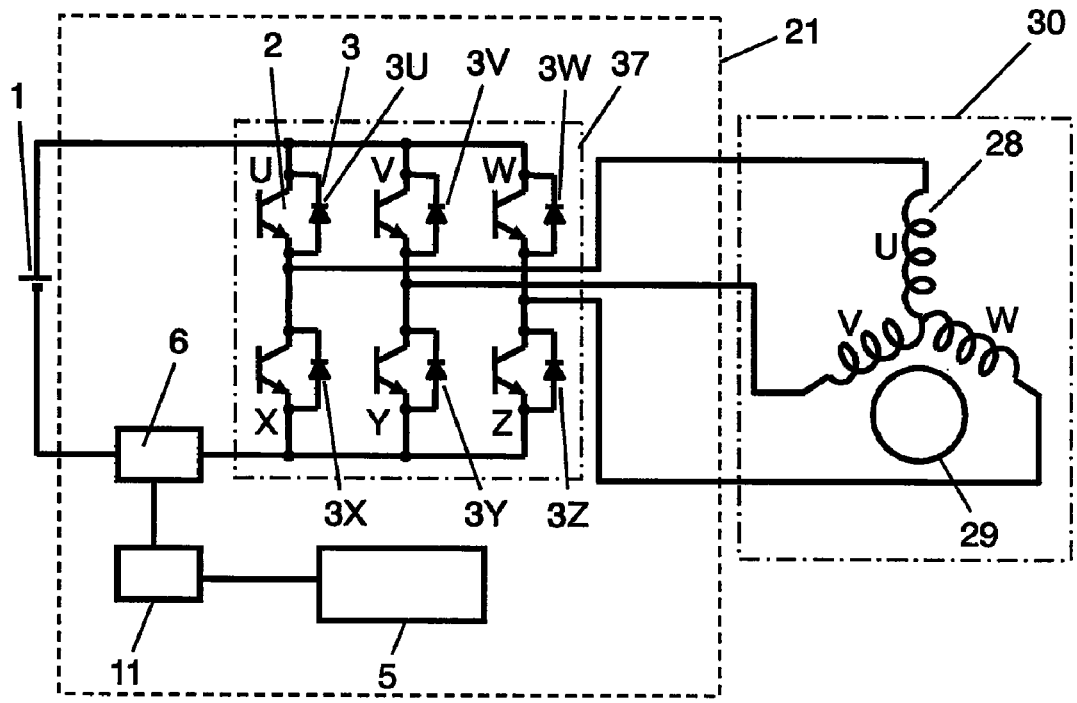
FIG. 1 is a circuit diagram of an inverter in accordance with a first exemplary embodiment of the present invention.

1 DC power supply (battery)
2 switching element
3 diode
4, 5, 7, 10, 14 control circuit
6, 8, 9, 15, 16, 17 current sensor
20, 21, 22, 23, 24 inverter
30, 31 load (motor)
37 inverter circuit
60 vehicle

DETAILED DESCRIPTION OF THE PREFERRED EMBODIMENTS

The exemplary embodiments of the present invention are described hereinafter with reference to the accompanying drawings.

First Exemplary Embodiment

Figure 23:
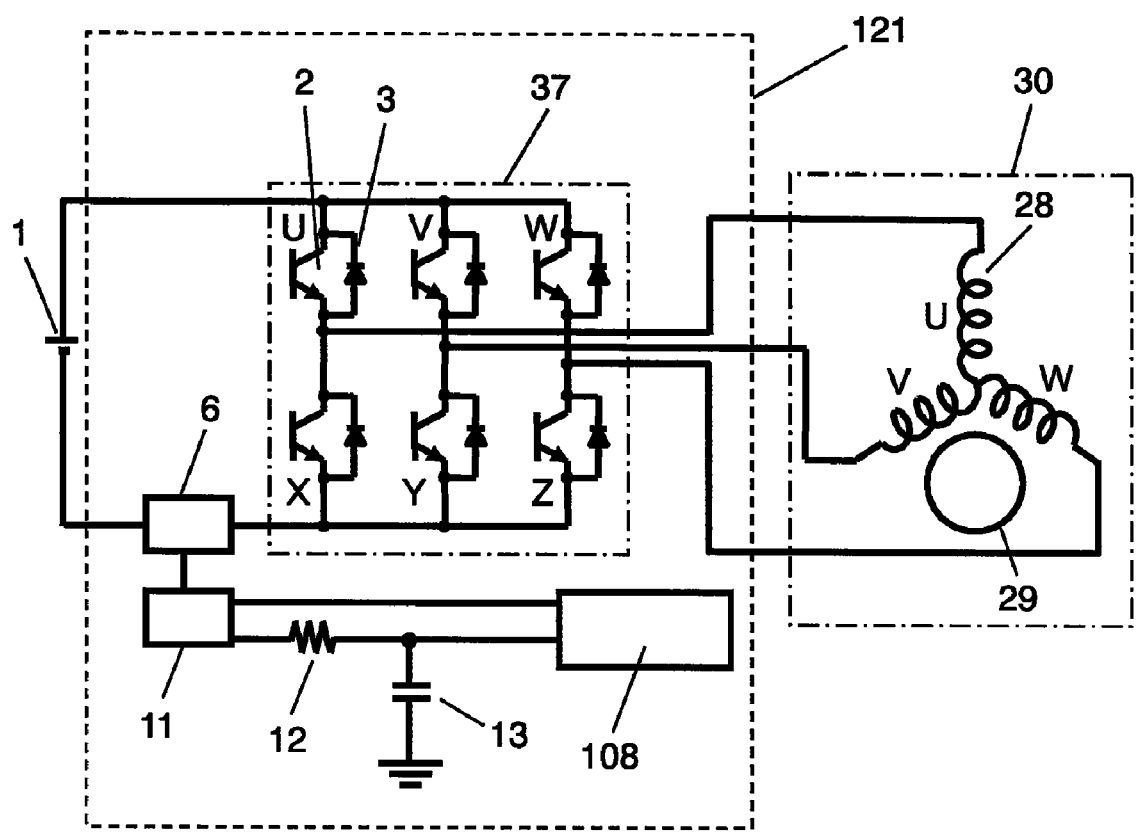
FIG. 23 is a circuit diagram of a conventional inverter having a current sensor disposed between DC power supply and an inverter circuit.

FIG. 1 is a circuit diagram of an inverter in accordance with the first exemplary embodiment of the present invention. FIG. 23 shows a circuit diagram of a conventional inverter. The difference between the two figures is that inverter 21 (FIG. 1) has no integrating circuit between operational amplifier 11 and control circuit 5. The integrating circuit of FIG. 23, which is formed of resistor 12 and capacitor 13, is used for calculating a DC average value. With no use of the integrating circuit, the structure of FIG. 1 has no input path for an integral value calculated by the integrating circuit to control circuit 5. For convenience's sake, explanations will be given hereinafter on the understanding that diodes 3U, 3V, 3W are connected in parallel to upper-arm switching elements U, V, W, respectively; and diodes 3X, 3Y, 3Z are connected in parallel to lower-arm switching elements X, Y, Z, respectively. In the rest of the structure in FIG. 1, like parts are identified by the same reference numerals as in FIG. 23.

In FIG. 1, according to an rpm instruction signal (not shown) and the like, control circuit 5 of inverter 21 effects control of switching elements 2 of inverter circuit 37 so that DC voltage from DC power supply 1 (hereinafter, battery 1) is switched by PWM. Through the modulation, AC is fed to stator winding 28 of motor 30. A peak value of DC, which is detected by current sensor 6 and is carried to control circuit 5 via operational amplifier 11, is used as a judgment indicator of protecting switching elements 2 and the like. According to the peak value and the switching operation of the switching elements, control circuit 5 calculates a DC average value between battery 1 and inverter 21.

Figure 2:
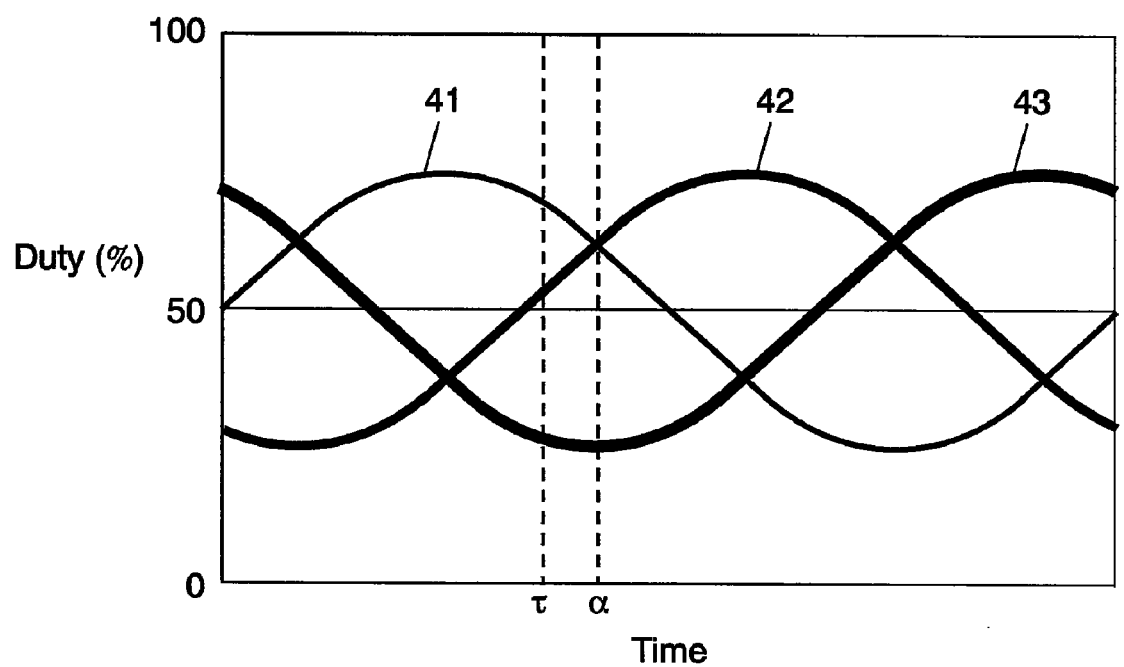
FIG. 2 shows duty characteristics of output waveforms of each phase of a sine-wave driving inverter.

Here will be described the calculation of a DC average value in a sine-wave driving inverter that outputs sine wave-shaped AC. FIG. 2 shows duty characteristics of output waveforms of each phase in 3-phase modulation of a sine-wave driving inverter. FIG. 2 shows characteristics of waveforms of U-phase terminal voltage 41, V-phase terminal voltage 42, W-phase terminal voltage 43. Each terminal voltage is applied as pulse voltage with pulse width of duty (%) shown in the vertical axis of the graph in 3-phase PWM.

Figure 3:
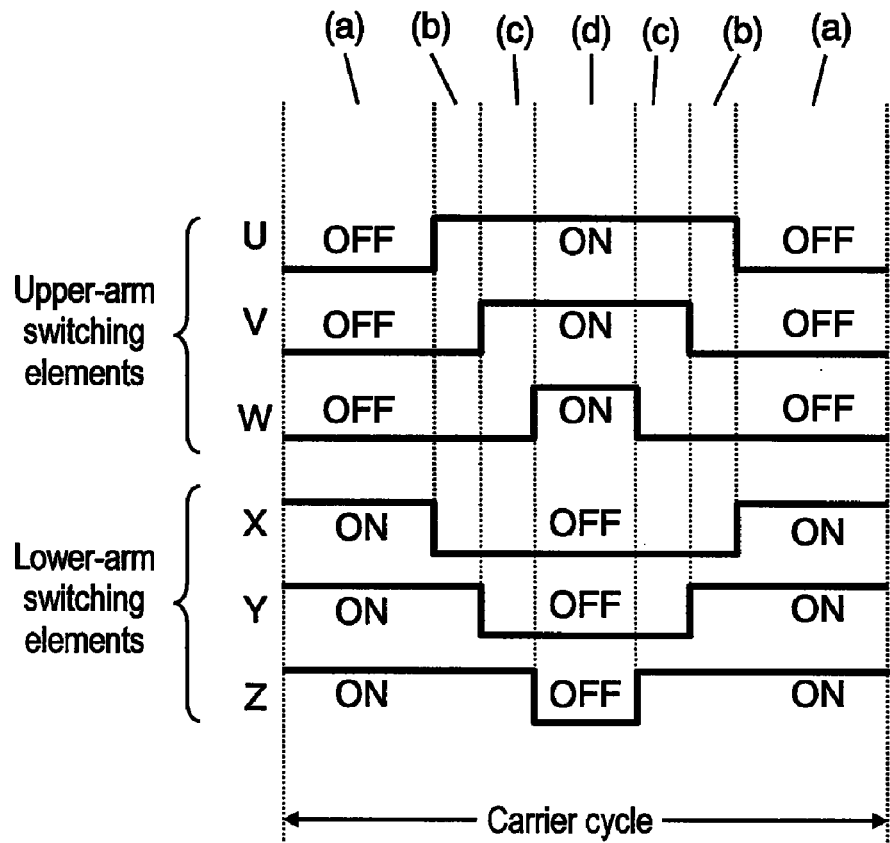
FIG. 3 is a timing chart illustrating a switching operation in a carrier cycle.

FIG. 3 is a timing chart of 3-phase modulation in one carrier (a carrier cycle), showing an on/off state of the upper-arm switching elements U, V, W and the lower-arm switching elements X, Y, Z. The switching operation is practically attained by triangular waves and a timer function of a microprocessor. For convenience's sake, FIG. 3 does not show a dead time that protects the upper-arm switching elements and the lower-arm switching elements from short-circuit. FIG. 3 shows the timing chart at around moment τ in FIG. 2. As is shown in FIG. 3, there are four switching patterns (a), (b), (c) and (d), each of the current paths is shown in the electric circuit diagrams of FIG. 4 through FIG. 7.

Figure 4:
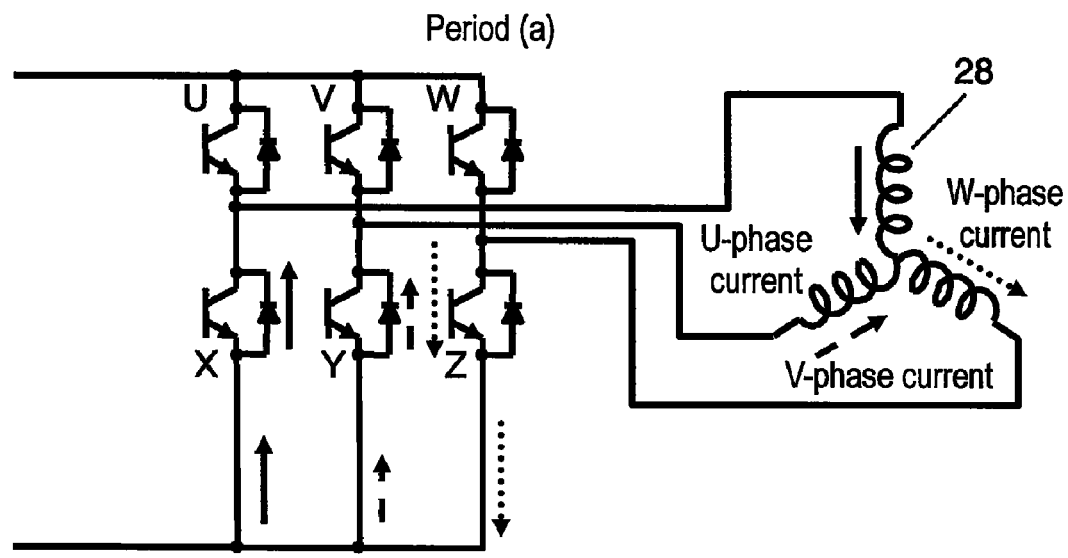
FIG. 4 is an electric circuit diagram showing the current path in period (a) of FIG. 3.

In the period of pattern (a) of FIG. 4, all of upper-arm switching elements U, V, W are turned off, and all of lower-arm switching elements X, Y, Z are turned on. The U-phase current and the V-phase current flow from diodes 3X and 3Y parallel to lower-arm switching elements X and Y, respectively, to stator winding 28. The W-phase current flows from stator winding 28 to lower-arm switching element Z. The current flows between the lower-arm switching elements and stator winding 28. That is, current is not fed from battery 1 to inverter circuit 37.

Figure 5:
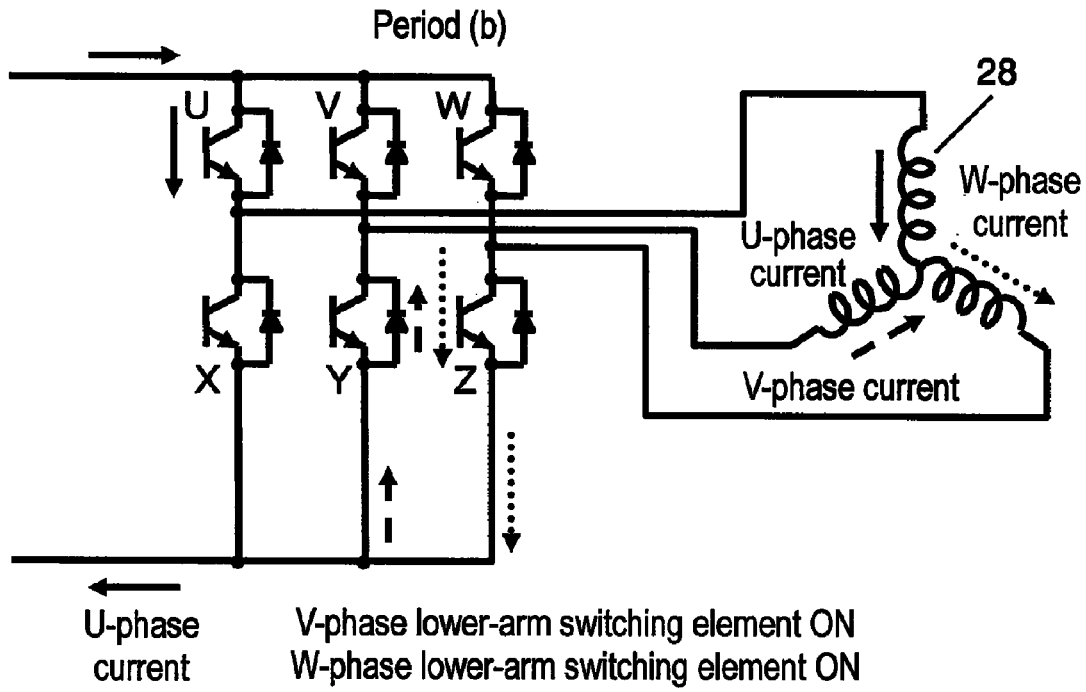
FIG. 5 is an electric circuit diagram showing the current path in period (b) of FIG. 3.

In the period of pattern (b) of FIG. 5, upper-arm switching element U and lower-arm switching elements Y, Z are turned on. In this period, the U-phase current flows from upper-arm switching element U to stator winding 28; the V-phase current flows from diode 3Y parallel to lower-arm switching element Y to stator winding 28; and the W-phase current flows from stator winding 28 to lower-arm switching element Z. That is, the current is fed from battery 1 to inverter circuit 37. In this period, the power-supply line carries the U-phase current.

Figure 6:
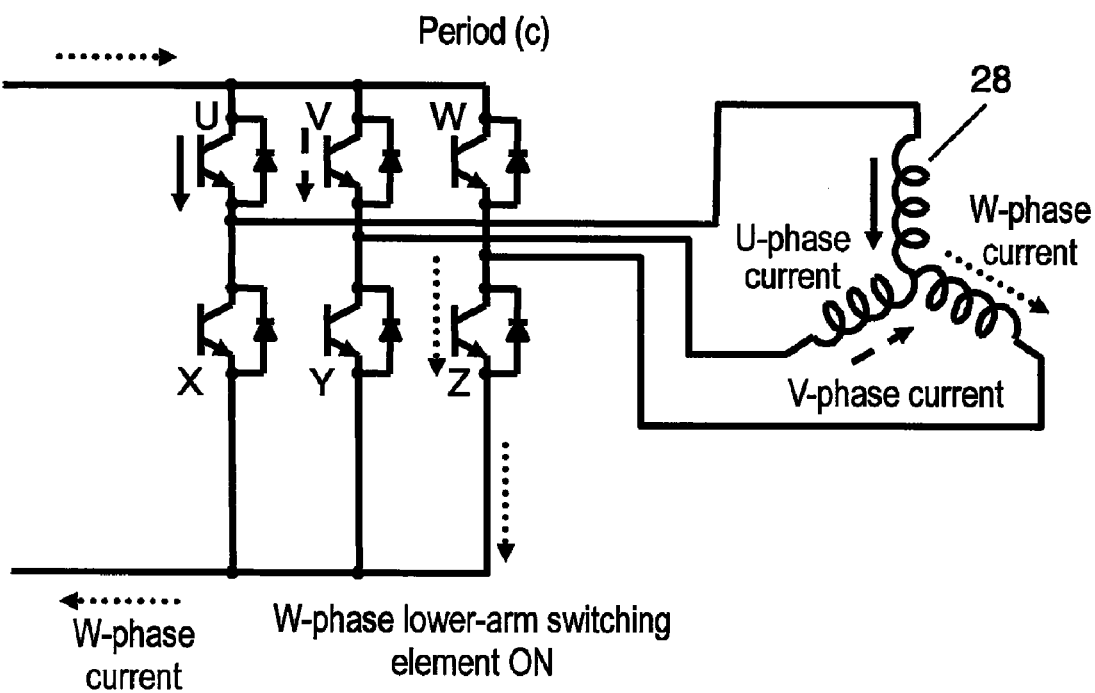
FIG. 6 is an electric circuit diagram showing the current path in period (c) of FIG. 3.

In the period of pattern (c) of FIG. 6, upper-arm switching elements U, V and lower-arm switching elements Z are turned on. In this period, the U-phase current and the V-phase current flow from upper-arm switching elements U and V, respectively, to stator winding 28; and the W-phase current flows from stator winding 28 to lower-arm switching element Z. That is, current is fed from battery 1 to inverter circuit 37. In this period, the power-supply line carries the W-phase current.

Figure 7:
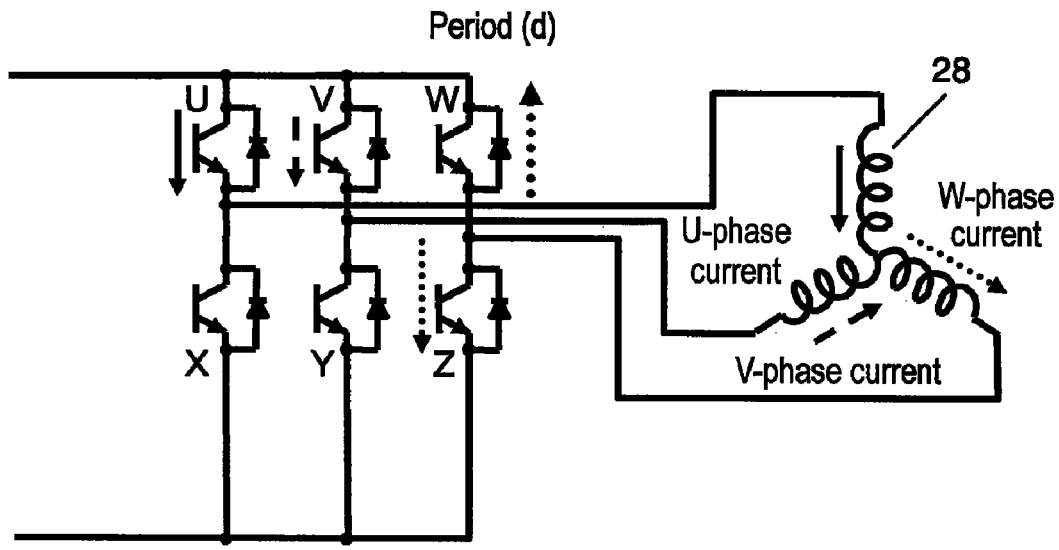
FIG. 7 is an electric circuit diagram showing the current path in period (d) of FIG. 3.

In period (d) of FIG. 7, all of upper-arm switching elements U, V, W are turned on, whereas all of lower-arm switching elements X, Y, Z are turned off. The U-phase current and the V-phase current flow from upper-arm switching elements U and V, respectively, to stator winding 28. The W-phase current flows from stator winding 28 to diode 3W parallel to upper-arm switching element W. The current flows between the upper-arm switching elements and stator winding 28. That is, current is not fed from battery 1 to inverter circuit 37.

Figure 8:
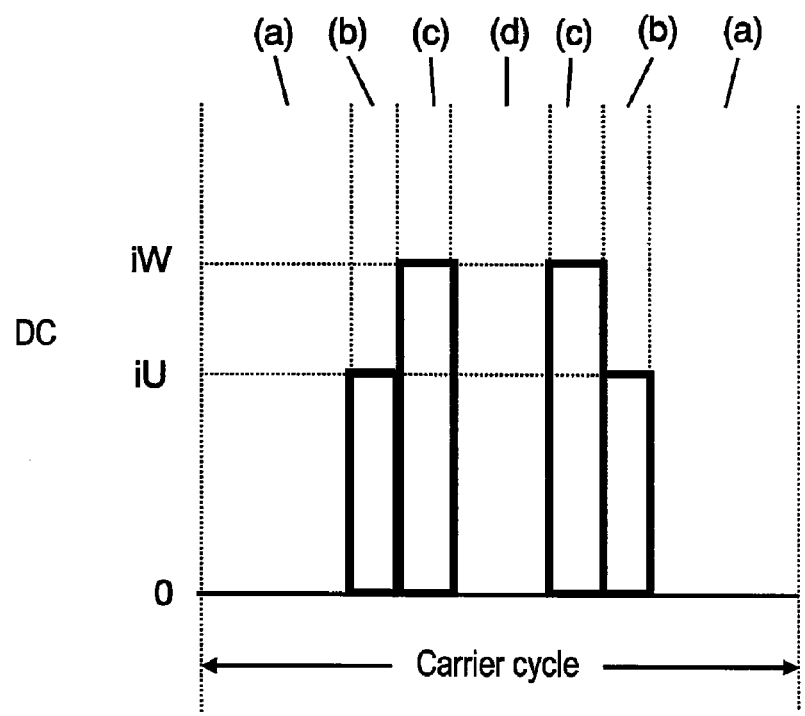
FIG. 8 shows DC that flows in a carrier cycle in the inverter in accordance with the first exemplary embodiment.

The FIG. 8 presents the aforementioned description in a graphical form; period (a) and period (d) carry no current, period (b) carries U-phase current iU, and period (c) carries W-phase current iW.

The on/off state of upper-arm switching elements U, V, W tells that whether or not the power-supply line carries current, and which phase of current flows when current is detected. That is, when all the three phases are turned off, no current flows (non-conducting state); when only one phase is turned on, the current corresponding to the phase flows (conducting state); when two phases are turned on, the current corresponding to the remaining phase flows (conducting state); and when all the three phases are turned on, no current flows (non-conducting state).

When two phases of the upper-arm switching elements are tuned on, a remaining phase of the lower-arm switching elements is turned on; in other words, when only one phase of the upper-arm switching elements is turned on, the current corresponding to the phase flows, and similarly, when only one phase of the lower-arm switching elements is turned on, the current corresponding to the phase flows.

As is shown in FIG. 8, upper-arm switching element U and lower-arm switching element Z turn on in the first-half and the last-half of the carrier. In this case, the DC average value of the carrier cycle is calculated as follows:

[(ON-period of upper-arm switching element U)× (phase current iU)+(ON-period of lower-arm switching element Z)×(phase current iW)]×2/ carrier period.

Control circuit 5 effects switching control of switching elements 2 of inverter circuit 37; the on/off state and ON-period of the switching elements and the carrier period are known data for control circuit 5. It is therefore not difficult for control circuit 5 to calculate a product of an ON-period of only one upper-arm switching element and a current value detected by current sensor 6 during the ON-period and a product of ON-period of only one lower-arm switching element and a current value detected by current sensor 6 during the ON-period. That is, a DC average value is easily derived from calculation of the obtained two products and a carrier period as a known data. Compared to a conventional method where the DC average value is obtained as an integral by a resistor and a capacitor, it is not only quite simple and quick, but also advantages below:

no worry about variations in resistance value of a resistor and in capacitance value of a capacitor; and no need to prepare correlation between an integral value of the integrating circuit and an actual DC average value.

Having the advantages above, the inverter of the embodiment provides highly accurate DC average value. Besides, the inverter has no need to have an integrating circuit (of a resistor and a capacitor) and an A/D port for receiving a DC average value to a microprocessor of a control circuit. This provides a compact, reliable inverter capable of calculating a DC average value with high accuracy.

It is apparent from FIG. 3 that the ON-period during which only one upper-arm switching element turns on can be replaced with the ON-period during which two lower-arm switching elements turn on; similarly, the ON-period during which only one lower-arm switching element turns on can be replaced with the ON-period during which two upper-arm switching elements turn on.

Second Exemplary Embodiment

Figure 9:
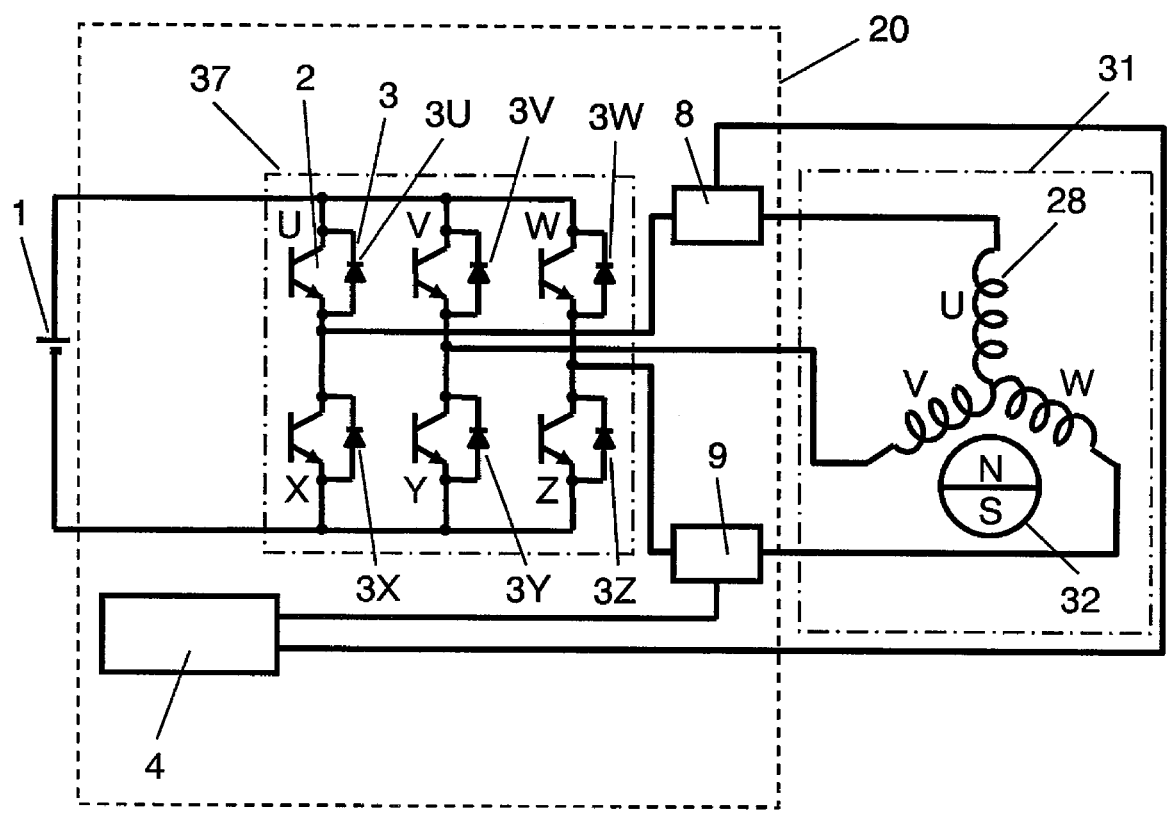
FIG. 9 is a circuit diagram of an inverter in accordance with a second exemplary embodiment of the present invention.
Figure 24:
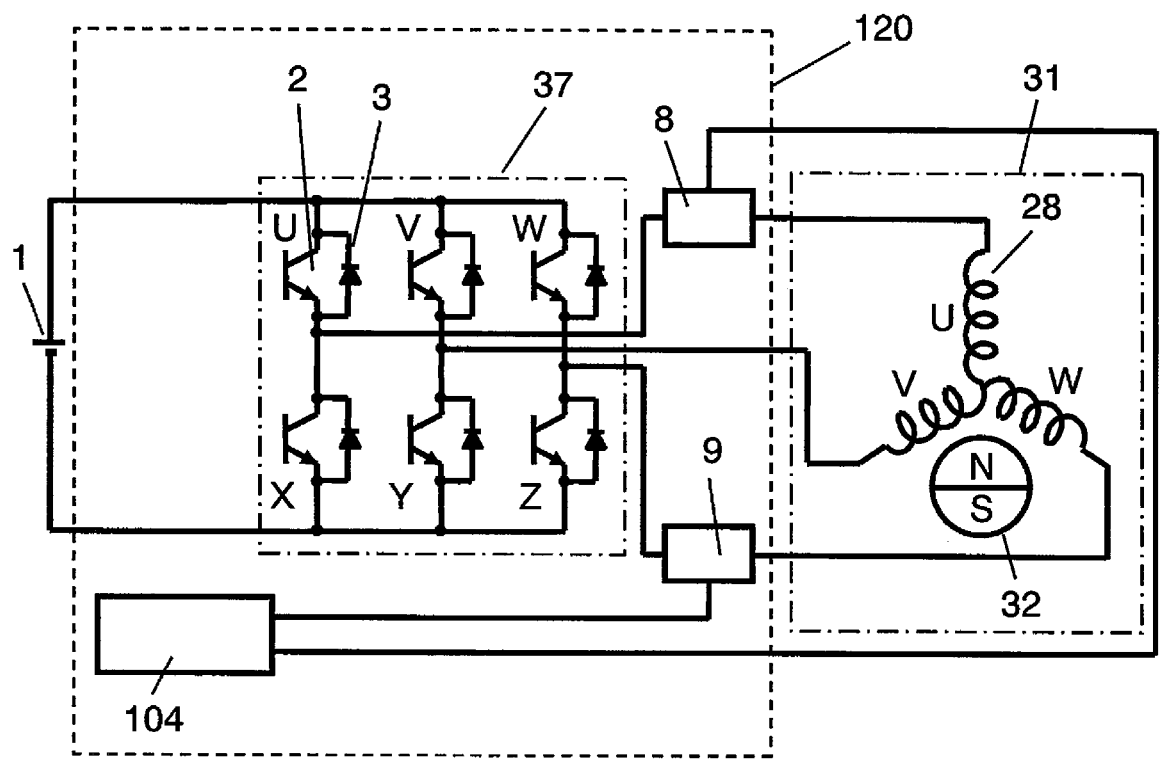
FIG. 24 is a circuit diagram of a conventional inverter having a current sensor disposed between a motor and an inverter circuit.

FIG. 9 is a circuit diagram of an inverter in accordance with the second exemplary embodiment of the present invention. Control circuit 4 and inverter 20 correspond to control circuit 104 and inverter 120, respectively, in FIG. 24 that shows a circuit diagram of a conventional inverter. As for the rest of the structure in FIG. 9, like parts are identified by the same reference numerals as in FIG. 24.

Control circuit 4 of inverter 20 receives a current value of U-phase from current sensor 8 and a current value of W-phase from current sensor 9. With the use of the two values obtained above, control circuit 4 calculates a current value of V-phase by Kirchhoff's current law applied at a neutral point of stator winding 28. According to the values for each phase, control circuit 4 further calculates induced voltage on stator winding 28 caused by magnet rotor 32 and determines the position of magnet rotor 32. According to an rpm instruction signal (not shown) and the like, control circuit 4 effects control of switching elements 2 of inverter circuit 37 so that DC voltage from battery 1 is switched by PWM. Through the modulation, sine wave-shaped AC is fed to stator winding 28.

According to the current values of each phase obtained above, control circuit 4 calculates an average value of DC that flows between battery 1 and inverter 20. Here will be described the calculation of a DC average value in a sine-wave driving inverter that outputs sine wave-shaped AC.

The relation between the on/off state of upper-arm switching elements U, V, W and the flow of DC is the same as those shown in FIG. 2 through FIG. 8 in the first exemplary embodiment. Like the calculation carried out in the first exemplary embodiment, control circuit 4 calculates a DC average value of the carrier cycle with the use of the expression below:

[(ON-period of upper-arm switching element U)×
(phase current iU detected by current sensor 8)+
(ON-period of lower-arm switching element Z)×
(phase current iW detected by current sensor
9)]×2/carrier period.

Like the structure in the first exemplary embodiment, the inverter of the second exemplary embodiment calculates a DC average value with high accuracy. Besides, the inverter has no need to have current sensor 6, operational amplifier 11, an integrating circuit of a resistor and a capacitor, and an A/D port for receiving a DC average value to a microprocessor of a control circuit. This provides a compact, reliable inverter capable of calculating a DC average value with high accuracy.

It is apparent from FIG. 3 that the ON-period during which only one upper-arm switching element turns on can be replaced with the ON-period during which only two lower-arm switching elements turn on; similarly, the ON-period during which only one lower-arm switching element turns on can be replaced with the ON-period during which only two upper-arm switching elements turn on.

Third Exemplary Embodiment

Figure 10:
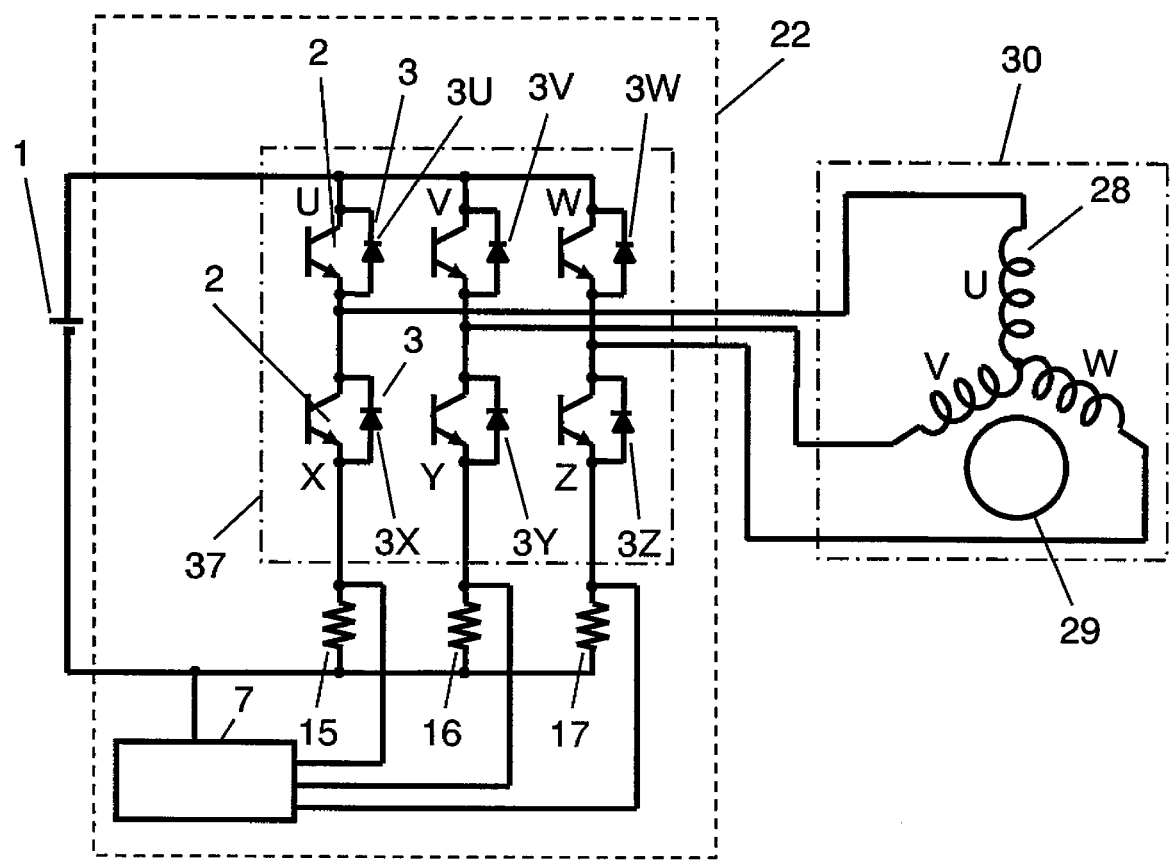
FIG. 10 is a circuit diagram of an inverter in accordance with a third exemplary embodiment of the present invention.
Figure 25:
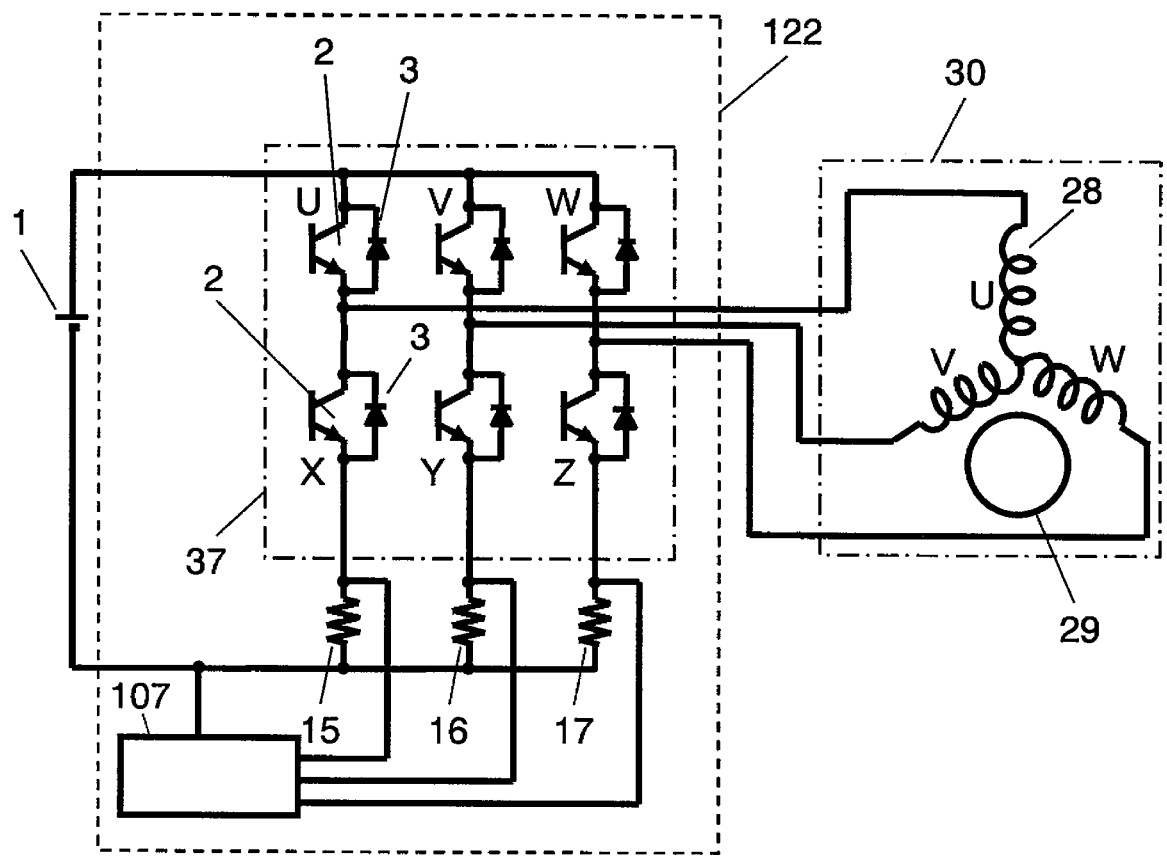
FIG. 25 is a circuit diagram of a conventional inverter having a current sensor disposed between DC power supply and lower-arm switching elements.

FIG. 10 is a circuit diagram of an inverter in accordance with the third exemplary embodiment of the present invention. Control circuit 7 and inverter 22 correspond to control circuit 107 and inverter 122, respectively, in FIG. 24 that shows a circuit diagram of a conventional inverter. As for the rest of the structure in FIG. 10, like parts are identified by the same reference numerals as in FIG. 25. Control circuit 7 of inverter 22 calculates a current value of each phase according to the values of voltage from each shunt that serves as a current sensor. According to the calculated current value, an rpm instruction signal (not shown) and the like, control circuit 7 effects control of switching elements 2 of inverter circuit 37 so that DC voltage from battery 1 is switched by PWM. Through the modulation, sine wave-shaped AC is fed to stator winding 28.

The operation described above is similarly carried out in a conventional structure; the difference between the inverter of the present invention and the conventional inverter is that control circuit 7 calculates an average value of DC that flows between battery 1 and inverter 22 according to the switching operation of the switching elements and calculated current value of each phase. Here will be described the calculation of a DC average value in a sine-wave driving inverter. The relation between the on/off state of upper-arm switching elements U, V, W and the flow of DC is the same as those shown in FIG. 2 through FIG. 8 in the first exemplary embodiment. Like the calculation carried out in the first exemplary embodiment, control circuit 7 calculates a DC average value of the carrier cycle with the use of the expression below:

[(ON-period of upper-arm switching element U)×
(phase current iU)+(ON-period of lower-arm
switching element Z)×(phase current iW)]×2/
carrier period.

Figure 11:
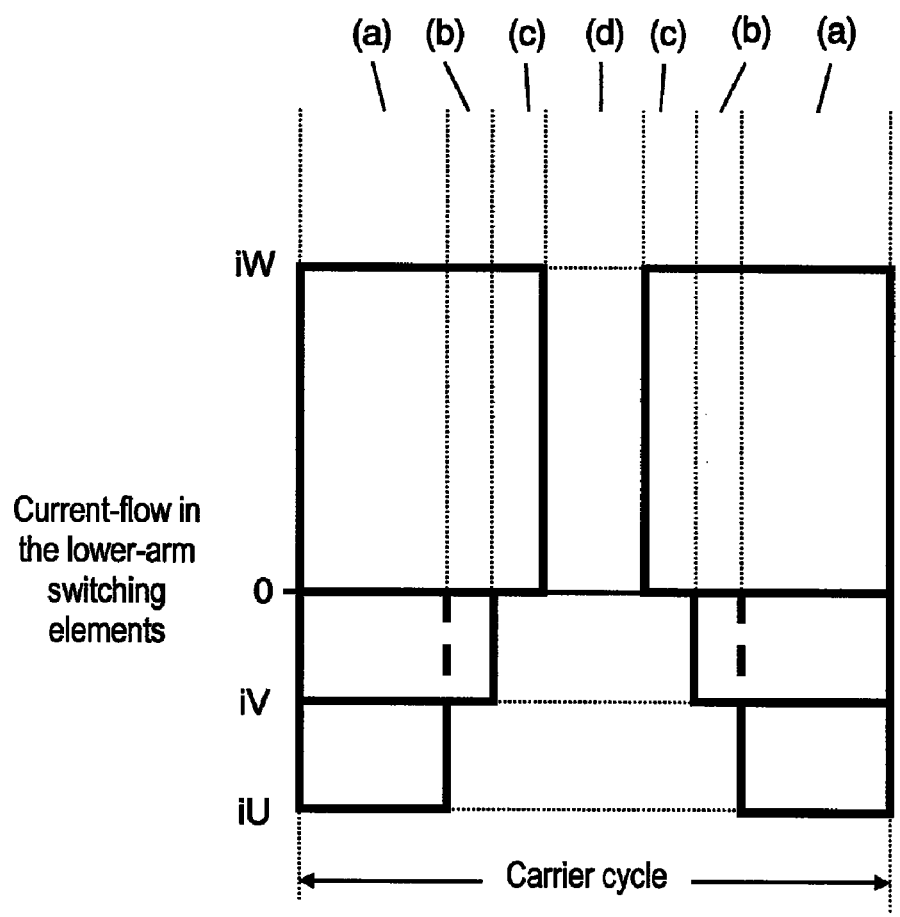
FIG. 11 shows characteristics of current in the lower-arm switching elements in a carrier cycle.

FIG. 11 shows the flow of phase current in the lower-arm switching elements in a carrier cycle, which corresponds to the flow of DC shown in FIG. 8. In period (a), the lower-arm switching elements carry current of all phases: the U-phase lower-arm switching element carries U-phase current iU; the V-phase lower-arm switching element carries V-phase current iV; and the W-phase lower-arm switching element carries W-phase current iW. The total amount of the current equals zero. In FIG. 11, a phase current that flows in the direction toward battery 1 is shown on the plus-side (i.e., on the upper side) and a current that flows in the opposite direction is shown on the minus-side (i.e., on the lower side).

In period (b), the lower-arm switching elements of two phases carry current: the V-phase lower-arm switching element carries V-phase current iV; and the W-phase lower-arm switching element carries W-phase current iW. In period (c), the lower-arm switching element of only one phase carries current: the W-phase lower-arm switching element carries W-phase current iW. In period (d), no lower-arm switching elements carry current.

As described above, when a lower-arm switching element of only one of the three phases turns on, the current that flows the lower-arm switching element of the phase corresponds to the amount of current that flows between battery 1 and inverter 37. When lower-arm switching elements of two phases turn on, the total amount of current that flows the lower-arm switching elements of the two phases corresponds to the amount of current that flows between battery 1 and inverter 37.

Control circuit 7 calculates a DC average value of the carrier cycle with the use of the expression below:

[(ON-period in which V-phase lower-arm switching
element Y and W-phase lower-arm switching
element Z simultaneously turn on)×(the total
amount of phase current iV that flows the
V-phase lower-arm switching element and phase
current iW that flows the W-phase lower-arm
switching element, which equals the amount of
phase current iU)+(On-period of W-phase lower-
arm switching element Z)×(phase current iW that
flows the W-phase lower-arm switching ele-
ment)]×2/carrier period.

Like the structure in the first exemplary embodiment, the inverter of the third exemplary embodiment calculates a DC average value with high accuracy. Besides, the inverter has no need to have current sensor 6, operational amplifier 11, an integrating circuit of a resistor and a capacitor, and an A/D port for receiving a DC average value to a microprocessor of a control circuit. This provides a compact, reliable inverter capable of calculating a DC average value with high accuracy.

It is apparent from FIG. 3 that the ON-period during which only one lower-arm switching element turns on can be replaced with the ON-period during which only two upper-arm switching elements turn on; similarly, the ON-period during which only two lower-arm switching elements turn on can be replaced with the ON-period during which only one upper-arm switching element turns on.

Fourth Exemplary Embodiment

Figure 12:
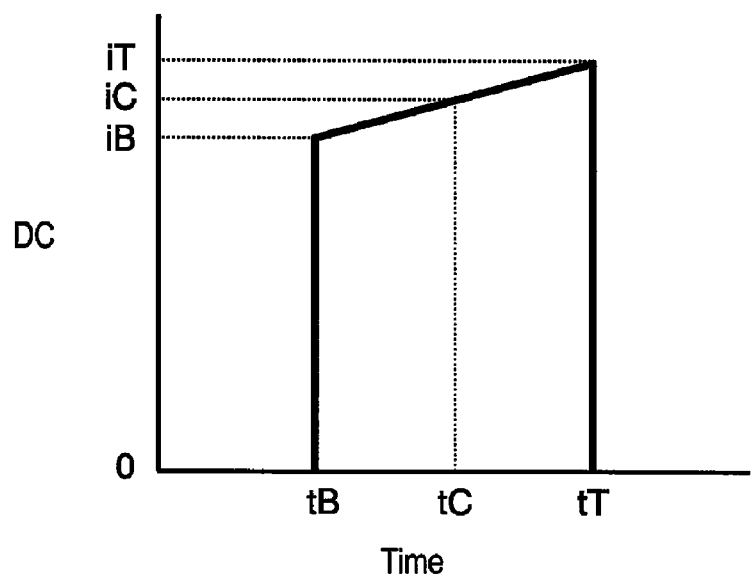
FIG. 12 shows changes in DC in a carrier cycle in accordance with a fourth exemplary embodiment.

FIG. 12 shows a detailed waveform of DC in a carrier cycle. Although FIGS. 8 and 11 show that a peak value of current maintains constant for simplicity, the peak value exhibits an inclination with a lapse of time, taking value iB at time tB and value iT at time tT.

The behavior of the peak value will be explained below. According to the law of electromagnetic induction, the equation below holds true:

$E=L di/dt$, (where, E represents application voltage from inverter 20 (21, 22) to stator winding 28; i represents current; t represents time; and L represents inductance of stator winding 28.)

Application voltage E maintains constant, and accordingly, the rate of change on time of current i (=di/dt) takes a constant value. That is, current i has a linear change as lapse of time t.

Detecting a current value at time tC (i.e., at a midpoint of the ON-period of a switching element) allows the inverter to have intermediate value iC of the current, enhancing the accuracy in calculating an average value.

Fifth Exemplary Embodiment

Figure 13:
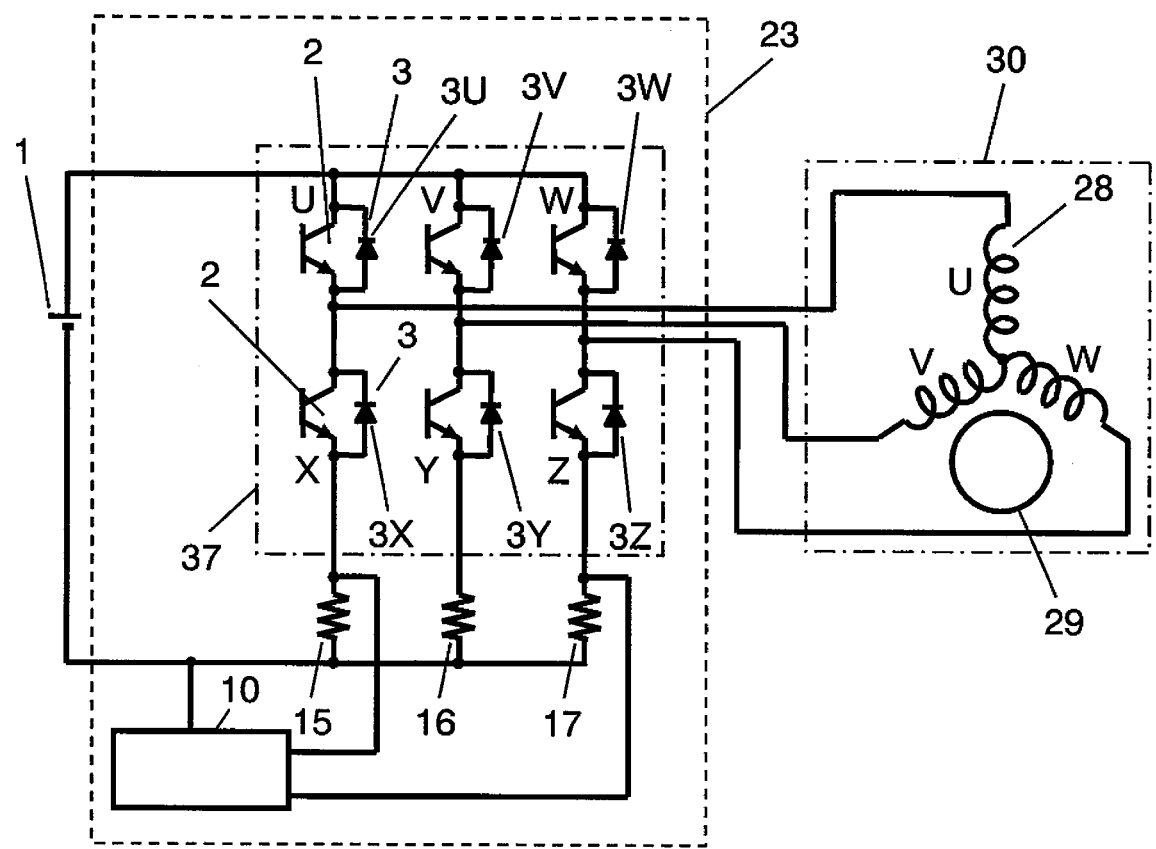
FIG. 13 is a circuit diagram of an inverter in accordance with a fifth exemplary embodiment of the present invention.

FIG. 13 is a circuit diagram of an inverter in accordance with the fifth exemplary embodiment of the present invention. Control circuit 10 and inverter 23 correspond to control circuit 7 and inverter 22, respectively, in FIG. 10 that shows a circuit diagram of the third exemplary embodiment. As for the rest of the structure in FIG. 13, like parts are identified by the same reference marks as in FIG. 10.

According to the third exemplary embodiment, the inverter calculates a value of DC in a carrier cycle as follows:

[(ON-period in which V-phase lower-arm switching element Y and W-phase lower-arm switching element Z simultaneously turn on)×(the total amount of phase current iV that flows the V-phase lower-arm switching element and phase current iW that flows the W-phase lower-arm switching element, which equals the amount of phase current iU)+(On-period of W-phase lower-arm switching element Z)×(phase current iW that flows the W-phase lower-arm switching element)]×2/carrier period.

That is, the inverter of the third exemplary embodiment detects phase current in the ON-period of a lower-arm switching element of only one phase or two phases.

In contrast, a current sensor of the inverter of the fifth exemplary embodiment detects current in the ON-period where all the lower-arm switching elements turn on, which corresponds to period (a) in FIG. 11. Although having a slightly impaired accuracy in DC average calculation, the inverter simultaneously detects current of the three phases. Besides, the inverter carries out current detection with ease because of no need to adjust detection timing as is needed in the third exemplary embodiment.

To be specific, the inverter of the embodiment calculates a DC average values as follows:

detecting V-phase current iV and W-phase current iW in the ON-period where all the lower-arm switching elements turn on;

substituting the current values above into the expression below.

[(ON-period in which V-phase lower-arm switching element Y and W-phase lower-arm switching element Z simultaneously turn on)×(the total amount of V-phase current iV and W-phase current iW, which equals the amount of current iU)+(On-period of W-phase lower-arm switching element Z)×(W-phase current iW)]×2/carrier period.

It is apparent from FIG. 3 that the ON-period during which only one lower-arm switching element turns on can be replaced with the ON-period during which only two upper-arm switching elements turn on; similarly, the ON-period during which only two lower-arm switching elements turn on can be replaced with the ON-period during which only one upper-arm switching element turns on.

Sixth Exemplary Embodiment

Figure 14:
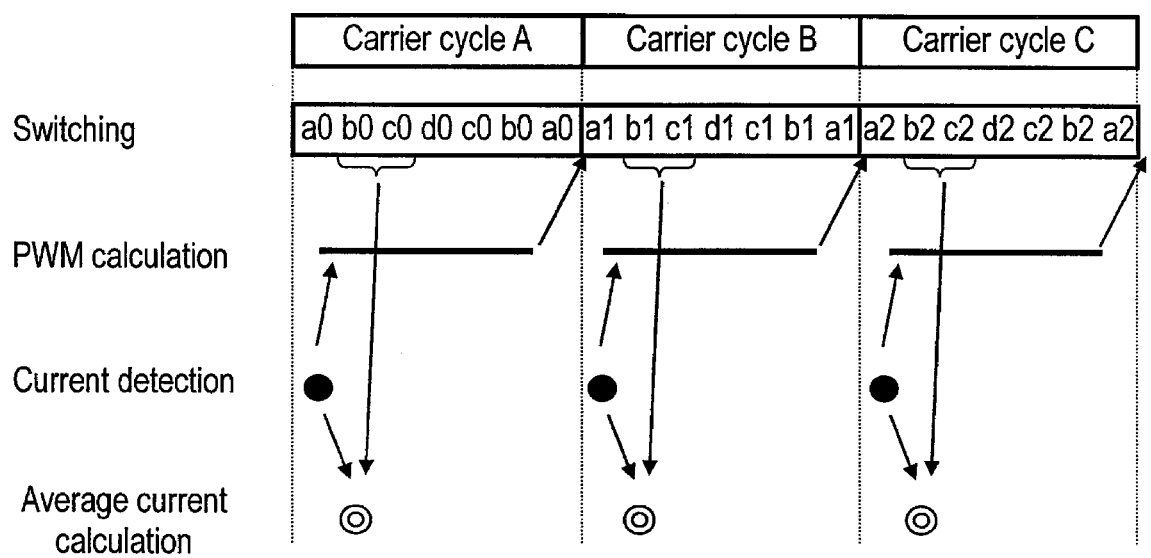
FIG. 14 illustrates a procedure of calculating a DC average value in accordance with a sixth exemplary embodiment.

FIG. 14 illustrates the process of calculating a DC average value in relation to carrier cycles. In FIG. 14, carrier cycles are named as carrier cycle A, carrier cycle B and carrier cycle C in chronological order. Carrier cycle A has switching periods of a0, b0, c0, d0, c0, b0 and a0. Similarly, carrier cycle B has switching periods of a1, b1, c1, d1, c1, b1 and a1; carrier cycle C has switching periods of a2, b2, c2, d2, c2, b2 and a2. Each of the switching periods corresponds to the timing chart of FIG. 3.

The inverter detects a current value of the lower-arm switching element in period a0 of carrier cycle A in which current flows the lower-arm switching elements of all three phases. According to the current value and already obtained time of period b0 and period c0 in carrier cycle A, the inverter calculates a DC average value. The inverter also begins calculation on PWM for determining switching operations of carrier cycle B and completes the calculation by the end of carrier cycle A. The inverter similarly operates in carrier cycles B and C.

Figure 15:
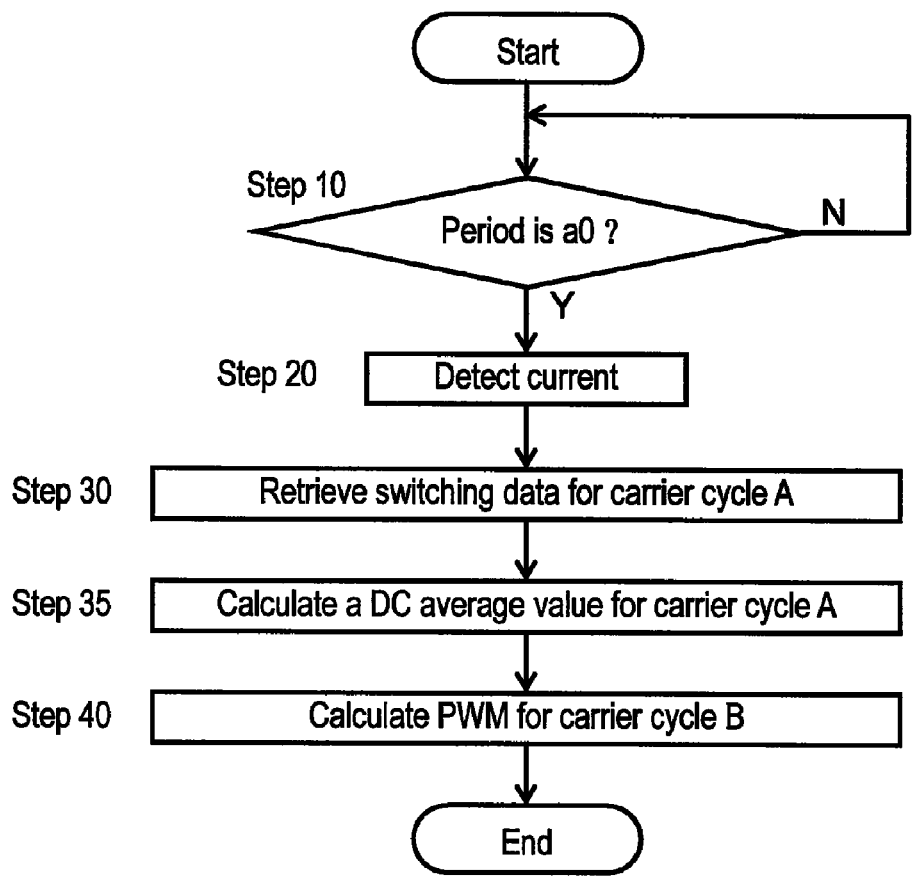
FIG. 15 is a flow chart showing the procedure of calculating a DC average value.

The flow chart of FIG. 15 illustrates the process of calculating a DC average value. In step 10, the switching period is judged whether it is period a0 or not. If the period is period a0, the procedure proceeds to step 20 where the inverter detects a current value of the lower-arm switching elements; otherwise, the procedure goes back to step 10. In step 30, the inverter acquires time data of period b0 and period c0 of carrier cycle A. In step 35, the inverter calculates a DC average value according to the data obtained in the previous steps. In step 40, the inverter begins calculation on PWM for determining switching operations of carrier cycle B and completes the calculation by the end of carrier cycle A.

Seventh Exemplary Embodiment

Figure 16:
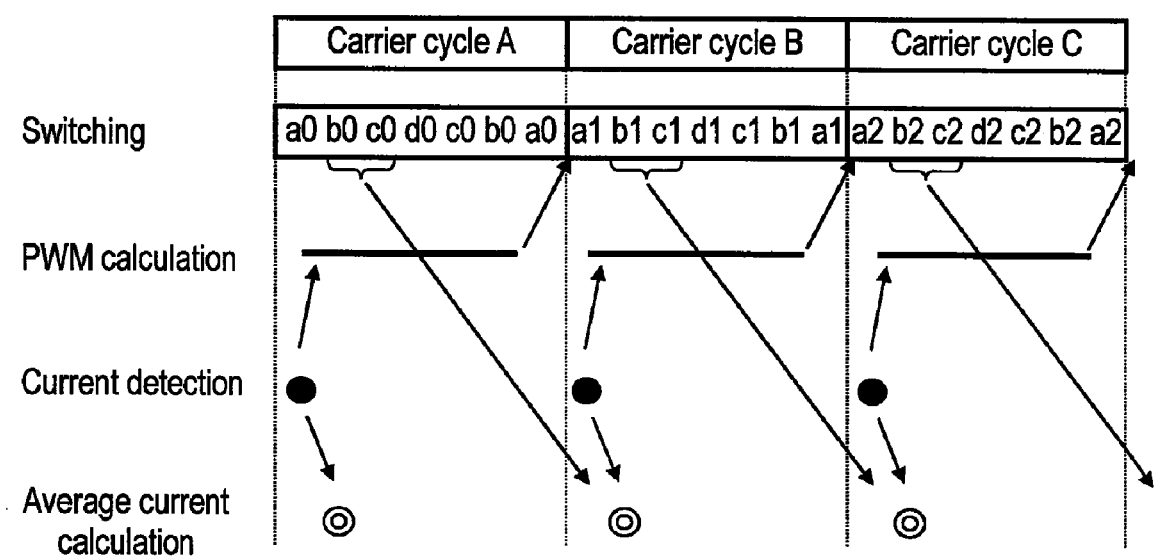
FIG. 16 illustrates a procedure of calculating a DC average value in accordance with a seventh exemplary embodiment.

FIG. 16 illustrates the process of calculating a DC average value in accordance with the seventh exemplary embodiment. The calculation process of the embodiment differs from the process shown in FIG. 14 in that a DC average value is calculated according to the switching period of one previous carrier cycle.

Figure 17:
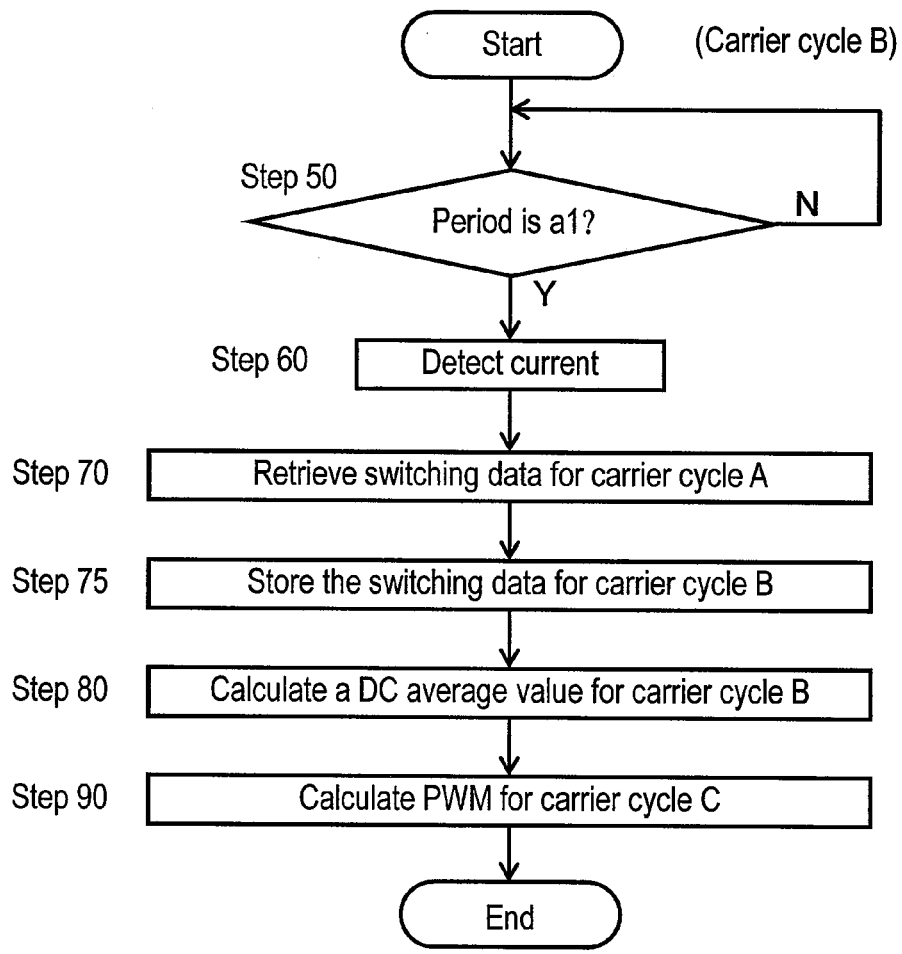
FIG. 17 is a flow chart showing the procedure of calculating a DC average value.

The flow chart of FIG. 17 illustrates the process of calculating a DC average value in carrier cycle B. In step 50, the switching period is judged whether it is period a1 in which current flows the lower-arm switching elements of all phases or not. If the period is period a1, the procedure proceeds to step 60 where the inverter detects a current value of the lower-arm switching elements; otherwise, the procedure goes back to step 50. In step 70, the inverter retrieves time data of period b0 and period c0 of carrier cycle A from storage. In step 75, the inverter stores time data of period b1 and period c1 in the storage for calculation in carrier cycle C. In step 80, the inverter calculates a DC average value according to the data obtained in the previous steps. In step 90, according to the current value calculated in step 80, the inverter begins calculation on PWM for determining switching operations of carrier cycle C and completes the calculation by the end of carrier cycle B.

Adjusting timing of current detection by a current sensor to the ON-period in which the lower-arm switching elements of all three phases turn on allows the inverter to provide a DC average value with higher accuracy.

Eighth Exemplary Embodiment

Figure 18:
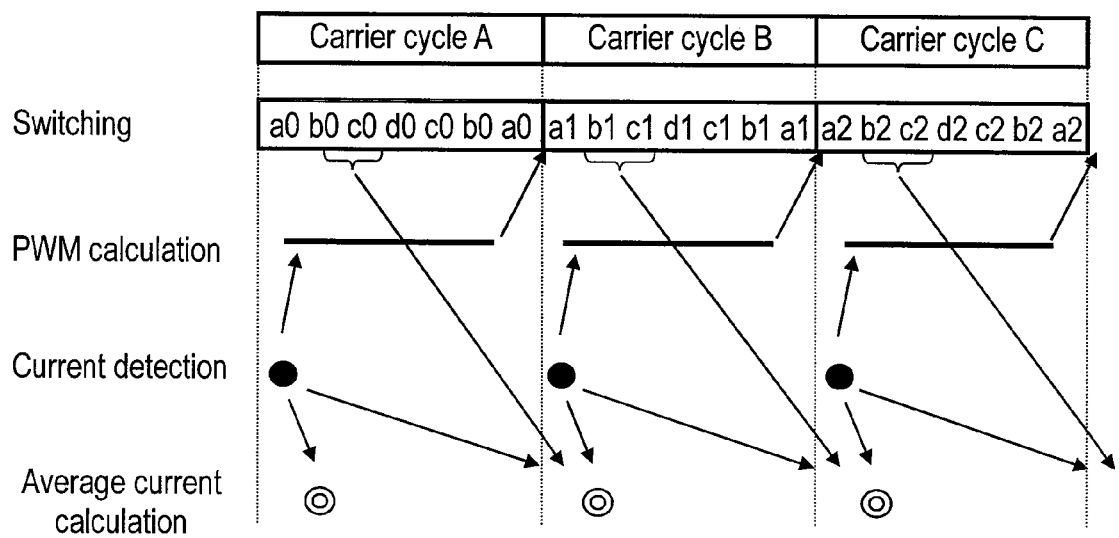
FIG. 18 illustrates a procedure of calculating a DC average value in accordance with an eighth exemplary embodiment.

FIG. 18 illustrates the process of calculating a DC average value in accordance with the eighth exemplary embodiment. The calculation process of the embodiment differs from the process shown in FIG. 16 in that a DC average value is calculated, according to an current value of one previous carrier cycle and an current value of an current carrier cycle. For example, the current value of one previous carrier cycle and the current value of the current carrier cycle are averaged. Calculating the average value of varying current in carrier cycles improves accuracy of DC average calculation. Assigning weights to each current value of the previous and the current carrier cycles may be similarly effective.

Ninth Exemplary Embodiment

Figure 19:
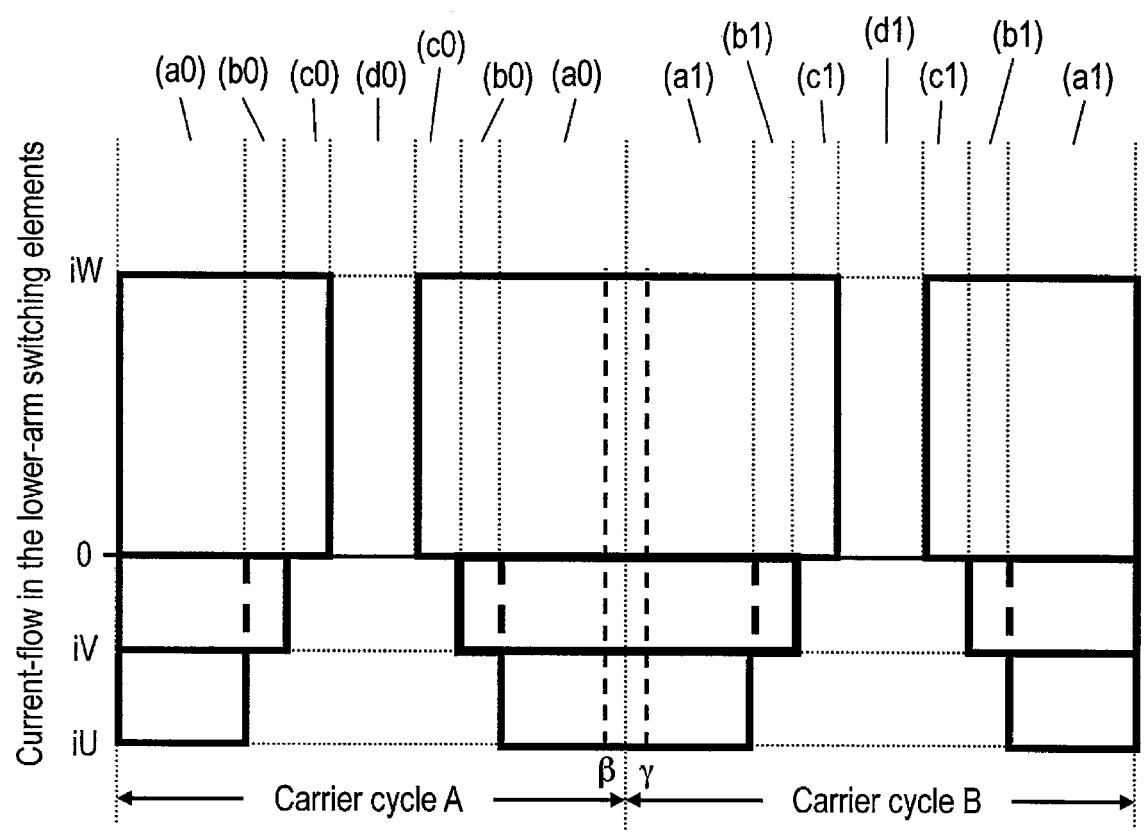
FIG. 19 shows detecting timing of current in accordance with a ninth exemplary embodiment.

FIG. 19 shows the current flowing a lower-arm switching element in carrier cycles A through B. From the last-half of carrier cycle A through the first-half of carrier cycle B, current of all the three phases (i.e., U-phase current iU, V-phase current iV and W-phase current iW) continuously flows; in particular, at around the border of cycles A and B, the current flow maintains transient stability.

Considering the fact above, current detection at around end point 8 of carrier cycle A or start point γ of carrier cycle B is effective in attaining a preferable result. That is, adjusting the timing of current detection at a start position or an end position of a carrier cycle allows the current detection without an error caused by unstable current flow, improving accuracy of DC average calculation.

Tenth Exemplary Embodiment

Figure 20:
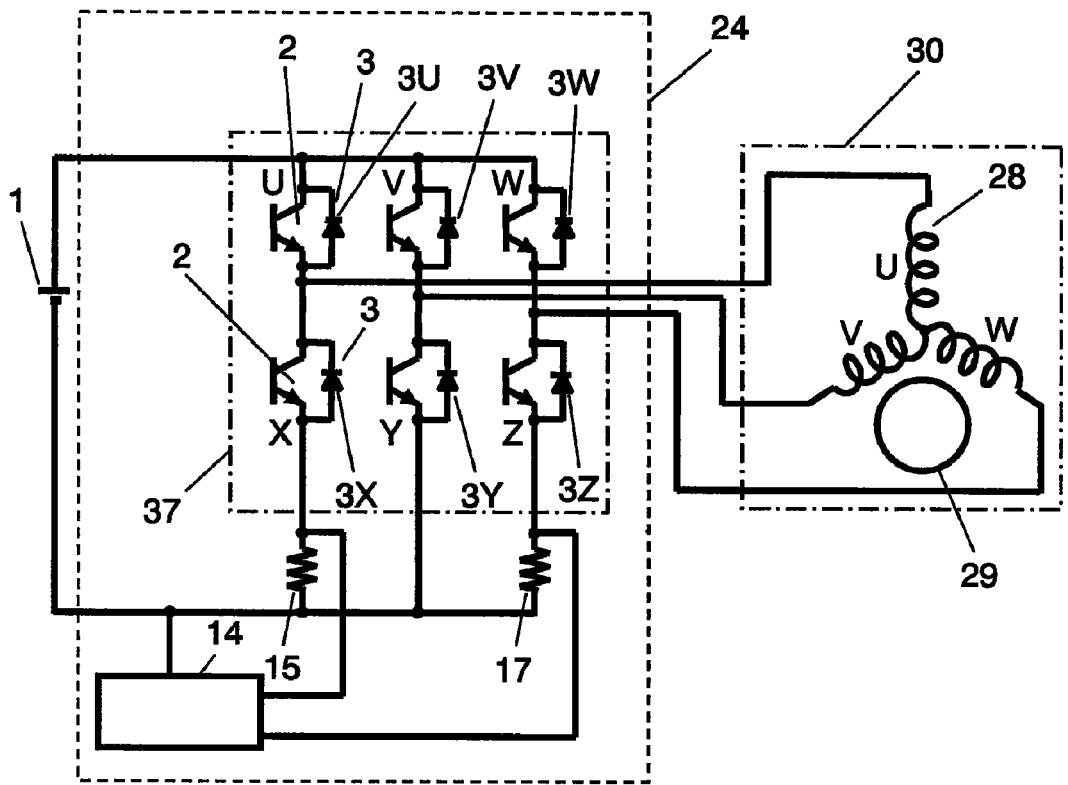
FIG. 20 is a circuit diagram of an inverter in accordance with a tenth exemplary embodiment of the present invention.

FIG. 20 shows a circuit diagram of an inverter in accordance with the tenth exemplary embodiment. The inverter of the embodiment does not contain shunt 16 that is disposed in inverter 22 of FIG. 10 in the third exemplary embodiment and in inverter 23 of FIG. 13 in the fifth exemplary embodiment. According to each structure in the third and the fifth embodiments, the inverter can determine a DC average value provided that the values of U-phase current iU and W-phase current iW is detected. Considering the structure for DC average calculation purposes only, the inverter satisfactorily operates with two shunts: U-phase shunt 15 and W-phase shunt 17. It will be understood that the current detection has a limitation in detectable period of phases because of only two current sensors.

In FIG. 2, the period detectable by the two current sensors is the period where U-phase terminal voltage 41 takes the maximum and W-phase terminal voltage 43 takes the minimum or vice versa. Instantaneous power maintains constant. Therefore, a DC average value can be calculated in the aforementioned period.

The structure of the embodiment reduces the number of current sensors, which contributes to a downsized inverter. The detectable period has a phase width of 60°. Calculating a DC average value at a phase width of 60° improves the accuracy of calculation.

Although the embodiment introduces the structure without V-phase shunt 16, it is not limited thereto. It will be understood that the detectable period varies depending on which current-sensor is removed. Time a in FIG. 2 is the state having the ON-period of W-phase lower-arm switching element Z only. Current detection with the use of W-phase shunt 17 only is a possibility—as long as the detection timing is fixed to time α.

Eleventh Exemplary Embodiment

The aforementioned exemplary embodiments have introduced the DC average calculation in a manner that the product of a current value and time of an ON-period is calculated in each of the first-half and the latter-half of a carrier cycle and then the summed-up value of the two products are divided by the time of the carrier period. The calculation can be changed like this:

calculating the product in either of the first-half or the latter-half of a carrier cycle; and dividing the result by half the time of the carrier period.

The modification reduces the computational burden on the microprocessor of the control circuit. Besides, calculating a DC average value for two-or-more carrier cycles cancels out errors in current detection, enhancing accuracy of DC average calculation.

Twelfth Exemplary Embodiment

Figure 21:
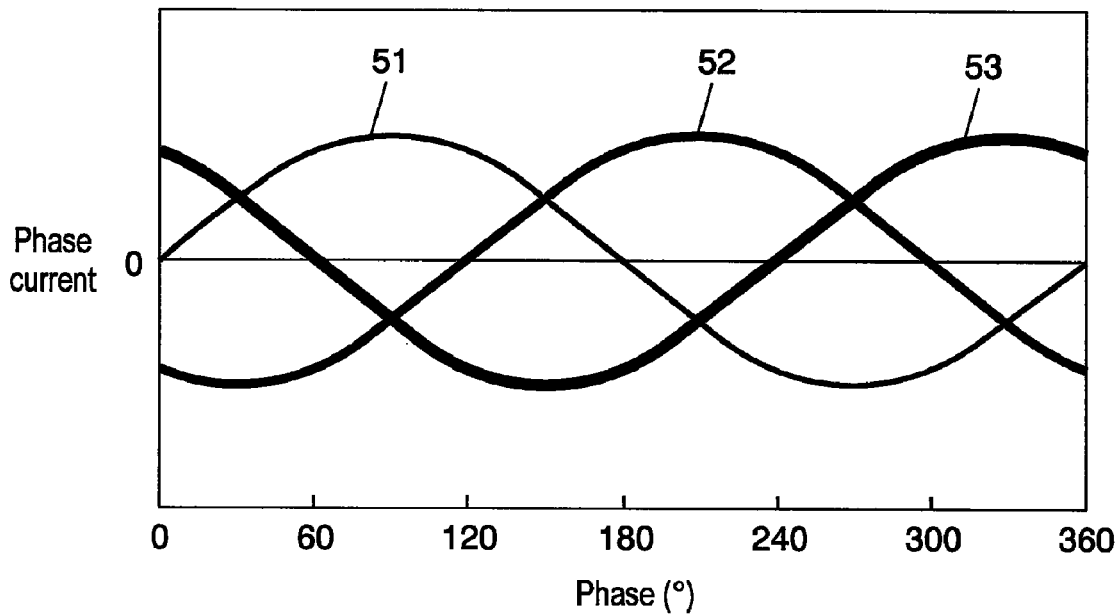
FIG. 21 shows waveforms in each phase in accordance with a twelfth exemplary embodiment.

FIG. 21 shows the relation between the phases and the waveforms of current of the three phases: U-phase current (iU) 51, V-phase current (iV) 52 and W-phase current (iW) 53. Current of each phase has a cyclic change by a phase width of 360° and the change is caused by variations in torque or other load. As shown in FIG. 8, the current of each phase appears in DC. Considering the cyclic change by a phase width of 360°, inverters 20, 21, 22 and 23 provide an accurate average value by calculating a DC average value by phase width of 360°.

In some motors, such as a sensorless brushless DC motor with a magnet rotor, a complete one turn of a magnet rotor may not correspond to a phase width of 360° because of difference in the number of poles of magnet rotors. In this case, calculating a DC average value on the basis of one turn of the magnet rotor (i.e., the motor) offers an accurate DC average value, with variations in current caused by variations in torque or the like for the one turn of the motor included.

The three phases keep an equilibrium condition; the DC average values of the three phases equal three times the DC average value of one phase. That is, the average values of the three phases can be calculated from an average value of one phase. Calculating a DC average value of any one phase (for example, phase current iU or phase current iW in FIG. 8) by a phase width of 360° provides DC average calculation with ease.

Thirteenth Exemplary Embodiment

Figure 22:
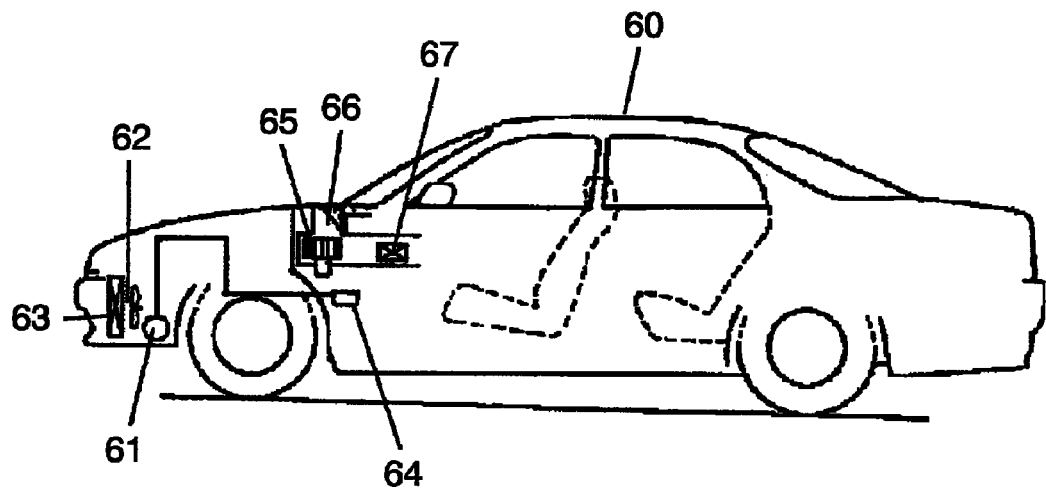
FIG. 22 is a schematic view of a vehicle having an inverter in accordance with a thirteenth exemplary embodiment.

FIG. 22 shows an example in which the inverter of the present invention is formed integral with a compressor and is mounted on a vehicle. Inverter-equipped compressor 61, outdoor heat-exchanger 63 and outdoor fan 62 are disposed in the engine room in the front of the vehicle. In the interior of the vehicle, indoor fan 65, indoor heat-exchanger 67 and air conditioning controller 64 are disposed. Captured through air inlet 66, outside air undergoes heat exchange in indoor heat-exchanger 67 and then flows into the interior of the vehicle.

Vehicles, in particular, electric vehicles and hybrid vehicles need a compact and lightweight air conditioner in terms of attainment of reliable driving performance and constraints on the installation space. Under the circumstances, it has become a critical challenge for an electric compressor in an effort of reducing its size and weight so as to be disposed in the space-limited motor room, engine room or other narrow spaces.

Employing the structures described in the embodiments allows the inverter to be compact. Furthermore, integrating such a compact inverter with a compressor contributes to a downsized compressor. The inverter of the present invention is therefore not limited to an air conditioner for vehicles, but widely used for various air conditioners. In particular, the inverter capable of calculating an accurate consumption power from DC power supply encourages energy-saving operation of air conditioning.

Although a motor is employed for load in each embodiment, it is not limited thereto; a transformer can be a load. As for types of motors, an induction motor, sensorless brushless DC motor and a reluctance motor are also applicable. In addition, not only for the 3-phase PWM, the structure of the present invention also operates on 2-phase PWM. The inverter of the present invention operates not only on sine-wave driving system but also on 120 degree driving system. Although the structure described in the embodiments uses a shunt as a current detector, it is not limited thereto—as long as the detector can detect an instantaneous peak value of current. Although each embodiment has described that the time in which DC flows between DC power supply and the inverter circuit agrees with the ON-period of a switching element, they slightly vary depending on a dead time and an operating time of a switching element and a diode. In calculation, time setting can be corrected according to the factors above.

INDUSTRIAL APPLICABILITY

The inverter of the present invention, as described above, offers highly accurate DC average value without having to use an integrating circuit (formed of a resistor and a capacitor) and an A/D port (for receiving a DC average value to a microprocessor of a control circuit). Being compact and highly reliable, the inverter is fit for a wide range of uses: for consumer products, industrial products and mobile devices. Besides, in the inverter of the present invention, a device operating on AC other than a motor can be a load.

The invention claimed is:

1. An inverter comprising:
   an inverter circuit formed of at least one upper-arm switching element and at least one lower-arm switching element connected to a DC power supply, the inverter circuit provides DC with pulse-width modulation so as to output AC to a load;
   a current sensor for detecting the current of the load; and
   a control circuit programmed to calculate an average value of DC that flows between the DC power supply and the inverter circuit by multiplying the duration of an ON-period in which either the at least one upper-arm switching element or the at least one lower-arm switching element turns on with a current value detected by the current sensor during the ON-period.

2. The inverter of claim 1, wherein the current sensor is disposed between the DC power supply and the inverter circuit, the average value of DC is calculated according to values below:
   a product of an ON-period in which only one upper-arm switching element turns on and a current value detected by the current sensor in the ON-period; and
   a product of an ON-period in which only one lower-arm switching element turns on and a current value detected by the current sensor in the ON-period.

3. The inverter of claim 1, wherein the current sensor is disposed between the DC power supply and the inverter circuit, the average value of DC is calculated according to values below:
   a product of an ON-period in which only two lower-arm switching elements turn on and a current value detected by the current sensor in the ON-period; and
   a product of an ON-period in which only two upper-arm switching elements turn on and a current value detected by the current sensor in the ON-period.

4. The inverter of claim 1, wherein the current sensor is disposed between the inverter circuit and the load, the average value of DC is calculated according to values below:
   a product of an ON-period in which only one upper-arm switching element turns on and a current value detected in the ON-period by the current sensor of a phase that corresponds to the turned-on upper-arm switching element; and
   a product of an ON-period in which only one lower-arm switching element turns on and a current value detected in the ON-period by the current sensor of a phase that corresponds to the turned-on lower-arm switching element.

5. The inverter of claim 1, wherein the current sensor is disposed between the inverter circuit and the load, the average value of DC is calculated according to values below:
   a product of an ON-period in which only two lower-arm switching elements turn on and a current value detected in the ON-period by the current sensor of a phase other than the two phases of the turned-on lower-arm switching elements; and
   a product of an ON-period in which only two upper-arm switching elements turn on and a current value detected in the ON-period by the current sensor of a phase other than the two phases of the turned-on upper-arm switching elements.

6. The inverter of claim 1, wherein the current sensor is disposed between the lower-arm switching elements and the DC power supply, the average value of DC is calculated according to values below:
   a product of an ON-period in which only one lower-arm switching element turns on and a current value detected in the ON-period by the current sensor of a phase that corresponds to the turned-on lower-arm switching element; and
   a product of an ON-period in which only two lower-arm switching elements turn on and a total of current values detected in the ON-period by the current sensor of the two phases that correspond to the turned-on lower-arm switching elements.

7. The inverter of claim 1, wherein the current sensor is disposed between the lower-arm switching elements and the DC power supply, the average value of DC is calculated according to values below:
   a product of an ON-period in which only two upper-arm switching elements turn on and a current value detected in the ON-period by the current sensor of a phase other than the two phases correspond to the turned-on upper-arm switching elements; and a product of an ON-period in which only one upper-arm switching element turns on and a total of current values detected in the ON-period by the current sensor of two phases other than the phase that corresponds to the turned-on upper-arm switching element.

8. The inverter of claim 1, wherein timing of current detection is determined at a midpoint of an ON-period of the upper-arm switching elements or the lower-arm switching elements.

9. The inverter of claim 1, wherein the current sensor, which is disposed between the lower-arm switching elements and the DC power supply, detects current in an ON-period in which all the lower-arm switching elements turn on, the average value of DC is calculated according to values below:

a product of an ON-period in which only one lower-arm switching element turns on and a current value detected in the ON-period by the current sensor of a phase that corresponds to the turned-on lower-arm switching element; and any one of a product of an ON-period in which only two lower-arm switching elements turn on and a total of current values detected in the ON-period by the current sensor of two phases that correspond to the turned-on lower-arm switching elements; and a product of the ON-period in which the two lower-arm switching elements turn on and a current value detected in the ON-period by the current sensor of a phase other than the two phases correspond to the turned-on lower-arm switching elements.

10. The inverter of claim 9, wherein the current sensor detects a current value in a carrier cycle where an ON-period in which only one lower-arm switching element turns on and an ON-period in which only two lower-arm switching elements turn on are defined.

11. The inverter of claim 9, wherein the current sensor detects a current value in a different carrier cycle from a carrier cycle where an ON-period in which only one lower-arm switching element turns on and an ON-period in which only two lower-arm switching elements turn on are defined.

12. The inverter of claim 9, wherein the current sensor detects a current value in a carrier cycle where an ON-period in which only one lower-arm switching element turns on and an ON-period in which only two lower-arm switching elements turn on are defined and in a different carrier cycle.

13. The inverter of claim 9, wherein the current sensor detects a current value in a carrier cycle where an ON-period in which only one lower-arm switching element turns on and an ON-period in which only two lower-arm switching elements turn on are defined and in a different carrier cycle, and timing of current detection is determined at a position close to a start position or close to an end position of the carrier cycle.

14. The inverter of claim 1, wherein the current sensor, which is disposed between the lower-arm switching elements and the DC power supply, detects current in an ON-period in which all the lower-arm switching elements turn on, and the average value of DC is calculated according to values below:

a product of an ON-period in which only two upper-arm switching elements turn on and a current value detected in the ON-period by the current sensor of a phase other than the two phases correspond to the turned-on upper-arm switching elements; and any one of a product of an ON-period in which only one upper-arm switching element turns on and a total of current values detected in the ON-period by the current sensor of two phases other than the phase that corresponds to the turned-on upper-arm switching element; and a product of the ON-period in which the only one upper-arm switching element turns on and a current value detected in the ON-period by the current sensor of the phase that corresponds to the turned-on upper-arm switching element.

15. The inverter of claim 14, wherein the current sensor detects a current value in a carrier cycle where an ON-period in which only two upper-arm switching elements turn on and an ON-period in which only one upper-arm switching element turns on are defined.

16. The inverter of claim 14, wherein the current sensor detects a current value in a different carrier cycle from a carrier cycle where an ON-period in which only two upper-arm switching elements turn on and an ON-period in which only one upper-arm switching element turns on are defined.

17. The inverter of claim 14, wherein the current sensor detects a current value in a carrier cycle where an ON-period in which only two upper-arm switching elements turn on and an ON-period in which only one upper-arm switching element turns on are defined and in a different carrier cycle.

18. The inverter of claim 14, wherein the current sensor detects a current value in a carrier cycle where an ON-period in which only two upper-arm switching elements turn on and an ON-period in which only one upper-arm switching element turns on are defined and in a different carrier cycle, and timing of current detection is determined at a position close to a start position or close to an end position of the carrier cycle.

19. The inverter of claim 6, wherein the current sensor is disposed for two phases only.

20. The inverter of claim 19, wherein the average value of DC is calculated in the AC with a phase width of 60°.

21. The inverter of claim 7, wherein the current sensor is disposed for two phases only.

22. The inverter of claim 21, wherein the average value of DC is calculated in the AC with a phase width of 60°.

23. The inverter of claim 1, wherein the average value of DC is calculated on a basis of a carrier cycle in the pulse-width modulation.

24. The inverter of claim 23, wherein the average value of DC is calculated in a first-half or a latter-half of a carrier cycle in the pulse-width modulation.

25. The inverter of claim 23, wherein the average value of DC is calculated for two-or-more carrier cycles.

26. The inverter of claim 1, wherein the average value of DC is calculated by phase width of 360° of the AC.

27. The inverter of claim 26, wherein an average value of three phases is determined by calculating the average value of DC for specific one phase of the AC and then multiplying the calculated average value by 3.

28. The inverter of claim 1, wherein a motor is employed for the load.

29. The inverter of claim 28, wherein the average value of DC is calculated for complete one turn of the motor.

30. The inverter of claim 28, which drives the motor used for an air conditioning device.

31. The inverter of claim 1, which is mounted on a vehicle.

32. The inverter of claim 1, wherein the current sensor is disposed between the DC power supply and the inverter circuit, and the average value of DC is calculated according to values below:

a product of an ON-period in which only one upper-arm switching element turns on with a current value detected by the current sensor during the ON-period; and a product of an ON-period in which only two upper-arm switching element turns on with a current value detected by the current sensor during the ON-period.

33. The inverter of claim 1, wherein the current sensor is disposed between the DC power supply and the inverter circuit, and the average value of DC is calculated according to values below:

a product of an ON-period in which only one lower-arm switching element turns on with a current value detected by the current sensor during the ON-period; and a product of an ON-period in which only two lower-arm switching element turns on with a current value detected by the current sensor during the ON-period.

* * * * *

UNITED STATES PATENT AND TRADEMARK OFFICE
CERTIFICATE OF CORRECTION

PATENT NO.       : 7,821,282 B2
APPLICATION NO.  : 11/910093
DATED            : October 26, 2010
INVENTOR(S)      : Yasufumi Kurahashi et al.

It is certified that error appears in the above-identified patent and that said Letters Patent is hereby corrected as shown below:

On the Cover Page, FIELD [30], Foreign Application Priority Data: "April 25, 2005 (JP) 1005-126060" should read --April 25, 2005 (JP) 2005-126060--

Signed and Sealed this
First Day of February, 2011

David J. Kappos
*Director of the United States Patent and Trademark Office*